(12) United States Patent
Siva Kumar et al.

(10) Patent No.: US 9,591,006 B2
(45) Date of Patent: Mar. 7, 2017

(54) LATERAL MOVEMENT DETECTION

(71) Applicant: MICROSOFT CORPORATION, Redmond, WA (US)

(72) Inventors: Ram Shankar Siva Kumar, Kirkland, WA (US); Nguyen Song Khanh Vu, Woodinville, WA (US); Marco DiPlacido, Waltham, MA (US); Vinod Nair, Bangalore (IN); Aniruddha Das, Watertown, MA (US); Matt Swann, Bothell, WA (US); Keerthi Selvaraj, Cupertino, CA (US); Sundararajan Sellamanickam, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/490,594

(22) Filed: Sep. 18, 2014

(65) Prior Publication Data
US 2016/0088000 A1 Mar. 24, 2016

(51) Int. Cl.
*H04L 29/06* (2006.01)

(52) U.S. Cl.
CPC ........ *H04L 63/1416* (2013.01); *H04L 63/083* (2013.01); *H04L 63/10* (2013.01); *H04L 63/1425* (2013.01)

(58) Field of Classification Search
CPC ...... G06F 3/0481; G06F 21/55; G06F 21/552; G06F 21/577; G06Q 20/4016;
(Continued)

(56) References Cited

U.S. PATENT DOCUMENTS 8,150,783 B2  4/2012  Gonsalves et al.
8,191,149 B2  5/2012  Yun et al.
(Continued)

OTHER PUBLICATIONS

Giura et al., "Using Large Scale Distributed Computing to Unveil Advanced Persistent Threats", In IEEE/ACM International Conference on Automated Software Engineering, Sep. 3, 2012, 13 pages.
(Continued)

*Primary Examiner* — Don Zhao
(74) *Attorney, Agent, or Firm* — Anand Gupta; Tom Wong; Micky Minhas

(57) ABSTRACT

Lateral movement detection may be performed by employing different detection models to score logon sessions. The different detection models may be implemented by and/or utilize counts computed from historical security event data. The different detection models may include probabilistic intrusion detection models for detecting compromised behavior based on logon behavior, a sequence of security events observed during a logon session, inter-event time between security events observed during a logon session, and/or an attempt to logon using explicit credentials. Scores for each logon session that are output by the different detection models may be combined to generate a ranking score for each logon session. A list of ranked alerts may be generated based on the ranking score for each logon session to identify compromised authorized accounts and/or compromised machines. An attack graph may be automatically generated based on compromised account-machine pairs to visually display probable paths of an attacker.

20 Claims, 6 Drawing Sheets

(58) Field of Classification Search
CPC ... H04L 63/1408; H04L 67/22; H04L 67/306; H04L 63/1425; H04L 63/20; H04L 63/10; H04L 63/1416; H04L 63/1433; H04L 63/083; H04L 9/0891
See application file for complete search history.

(56) References Cited

U.S. PATENT DOCUMENTS

| | | | |
|---|---|---|---|
| 9,148,424 B1* | 9/2015 | Yang | |
| 2006/0070128 A1 | 3/2006 | Heimerdinger et al. | |
| 2009/0099988 A1 | 4/2009 | Stokes et al. | |
| 2011/0167493 A1* | 7/2011 | Song et al. | 726/23 |
| 2012/0227108 A1 | 9/2012 | Noel et al. | |
| 2013/0254857 A1* | 9/2013 | Bajenov et al. | 726/7 |
| 2013/0298244 A1 | 11/2013 | Kumar et al. | |
| 2013/0312092 A1* | 11/2013 | Parker | 726/22 |
| 2014/0282871 A1* | 9/2014 | Rowland et al. | 726/3 |
| 2014/0325645 A1* | 10/2014 | Turgeman et al. | 726/22 |

OTHER PUBLICATIONS

Hewlett-Packard Development Company, L.P., "HP Attack Life Cycle use case methodology", In Technical White Paper, Mar. 2014, Retrieved from <<http://h20195.www2.hp.comN2/GetPDF.aspx%2F4AA4-9490ENW.pdf>>, 11 pages.

Critical Start, LLC, "US-Cert Targeted Cyber Intrusion Detection and Mitigation Strategies (ICS-TIP-12-146-01B)", Published: Jan. 29, 2013, Retrieved from <<http://www.criticalstart.com/2013/01/targeted-cyber-intrusion-detection-and-mitigation-strategies-ics-tip-12-146-01a/>>, 5 pages.

Flessing, J., "Detecting Simple Lateral Movement with Active Defense", Published: Dec. 4, 2012 Retrieved from <<http://mcsi.mantech.com/blog/detecting-simple-lateral-movement-active-defense>>, 2 pages.

Trend Micro, Inc., "Lateral Movement: How Do Threat Actors Move Deeper Into Your Network?", Published: Jun. 17, 2013, Retrieved from <<about-threats.trendmicro.com/cloud-content/us/ent-primers/pdf/tlp_lateral_movement.pdf>>, 7 pages.

Anthony, Russ, "Detecting Security Incidents Using Windows Workstation Event Logs", In Whitepaper from SANS Institute Reading Room site, Aug. 16, 2013, 35 pages.

Hsieh, Spencer, "Building Threat Intelligence to Detect APTs in Lateral Movement", Published on: Jul. 11, 2013, Retrieved from <<http://blog.trendmicro.com/trendlabs-security-intelligence/building-threat-intelligence-to-detect-aptsin-lateral-movement/>>, 2 pages.

ICS-Cert, "Targeted Cyber Intrusion Detection and Mitigation Strategies (Update B)", Published: Feb. 6, 2013, Retrieved from <<http://ics-cert.us-cert.gov/tips/ICS-TIP-12-146-01B>>, 4 pages.

Jungles et al., "Mitigating Pass-the-Hash (PtH) Attacks and Other Credential Theft Techniques", Published: Dec. 2012, Retrieved from <<http://www.microsoft.com/en-us/download/details.aspx?id=36036>>, 82 pages.

Jungles et al., "Mitigating Pass-the-Hash and Other Credential Theft, version 2", Published: Jul. 7, 2014, Retrieved from <<http://www.microsoft.com/en-us/download/details.aspx?id=36036>>, 60 pages.

"International Search Report & Written Opinion Issued in PCT Application No. PCT/US2015/050312", Mailed Date: Dec. 15, 2015, 13 Pages.

Lee, et al., "A Systematic Framework", In Journal of ACM Transactions on Information and System Security, vol. 3, Issue 4, Nov. 1, 2000, 35 Pages.

"International Preliminary Report on Patentability Issued in PCT Application No. PCT/US2015/050312", Mailed Date: May 30, 2016, 16 Pages.

* cited by examiner

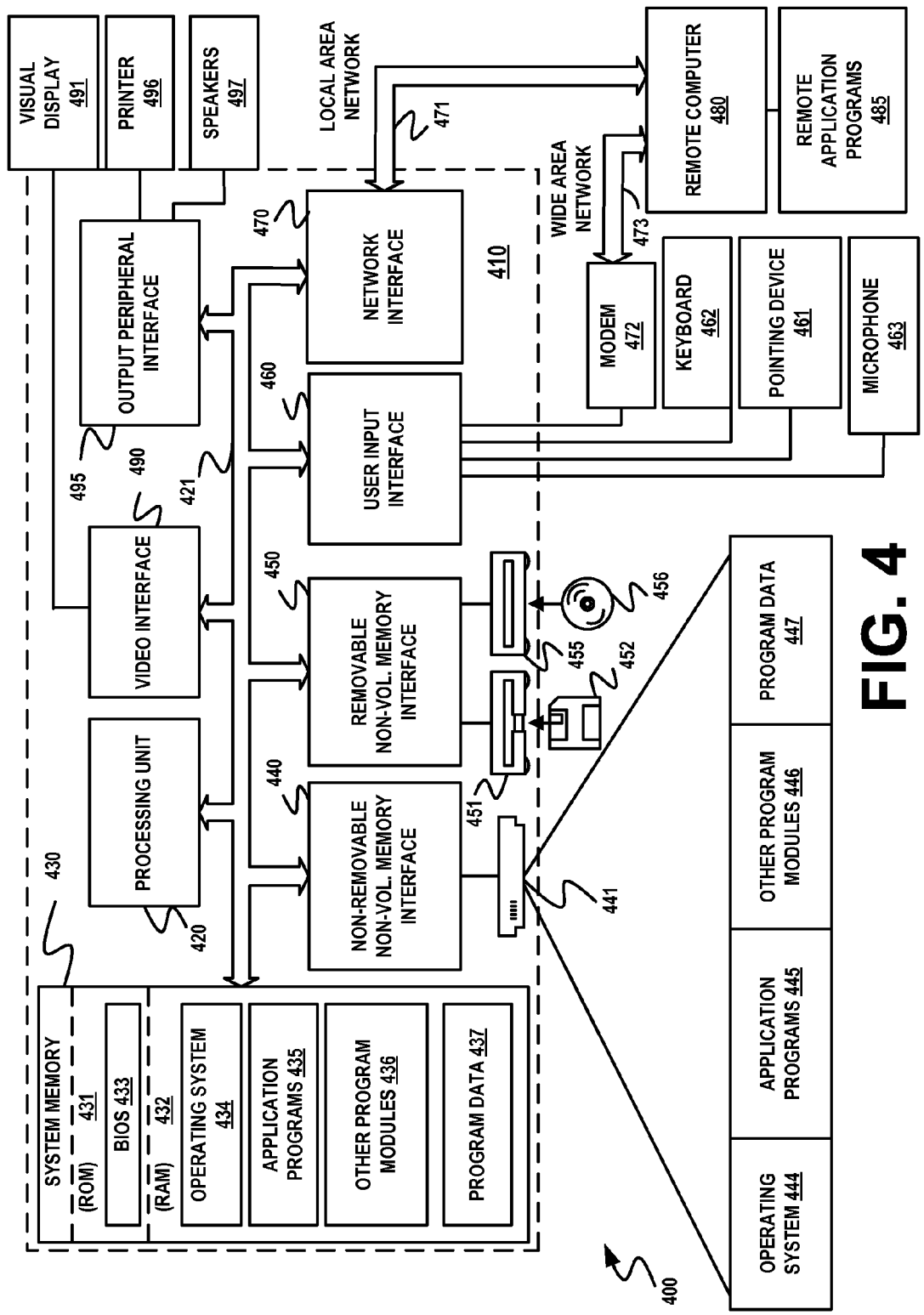

LATERAL MOVEMENT DETECTION

BACKGROUND

An organization typically will employ a variety of defensive mechanisms to mitigate the risk of computer network attacks. Despite taking such precautions, an organization nevertheless may fall victim to a successful attack that breaches its computer network. There are many ways for an attacker to get a foothold into the computer network of an organization such as by enticing a user to click a malicious link in a phishing e-mail message or by exploiting known or unpatched vulnerabilities. When such tactics are successful, an attacker may obtain the ability to run malicious code and compromise the computer network of the organization.

Upon compromising an initial computer of the organization, the attacker may use credentials stolen from the initial compromised computer to access and compromise other machines within the computer network. In general, the goal of the attacker is to locate credentials having elevated permissions that allow access to high-value machines such as infrastructure servers and domain controllers. An attacker that successfully obtains domain administrator credentials could compromise all computers within a domain of the organization as well as external domains that trust the organization If the stolen credentials from the initial compromised computer do not have elevated permissions, the attacker typically will initiate lateral movement to other connected computers that can be accessed and searched for additional credentials. In general, the attacker may use local administrator account credentials stolen from the initial compromised computer to access and compromise other computers on the same network tier. The attacker may continue lateral movement and breaching computers within the same network tier until locating credentials that allow privilege escalation and deeper network traversal. Upon locating credentials having elevated permissions, the attacker then progresses to the next network tier and again performs lateral movement in search of higher privileges.

If lateral movement is not detected, a local compromise may spread and become a global intrusion. As such, it is important to be able to detect the lateral movement of an attacker as soon as possible so that the scope of a breach can be determined and appropriate containment and remediation can be performed.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, lateral movement detection may be performed by employing different detection models to score logon sessions that include activities performed by authorized accounts on machines of a computer network. The different detection models may be implemented by and/or utilize counts computed from historical security event data. The different detection models may include probabilistic intrusion detection models for detecting compromised behavior based on logon behavior, a sequence of security events observed during a logon session, inter-event time between security events observed during a logon session, and/or an attempt to logon using explicit credentials.

Each different detection model may output one or more scores for each logon session that assess whether one or more security events that occurred during the logon session are indicative of compromised behavior. Scores for each logon session that are output by different detection models provide independent assessments of whether the one or more security events that occurred during the logon session are indicative of compromised behavior based on different types of logon session behavior.

The scores for each logon session that are output by the different detection models may be combined to generate a ranking score for each logon session. A list of ranked alerts may be generated based on the ranking score for each logon session to identify compromised accounts and/or compromised machines of the computer network. An attack graph may be automatically generated based on compromised account-machine pairs to visually display one or more probable paths of an attacker.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 4 illustrates an embodiment of an exemplary computing environment that may implement aspects of the described subject matter.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1A:
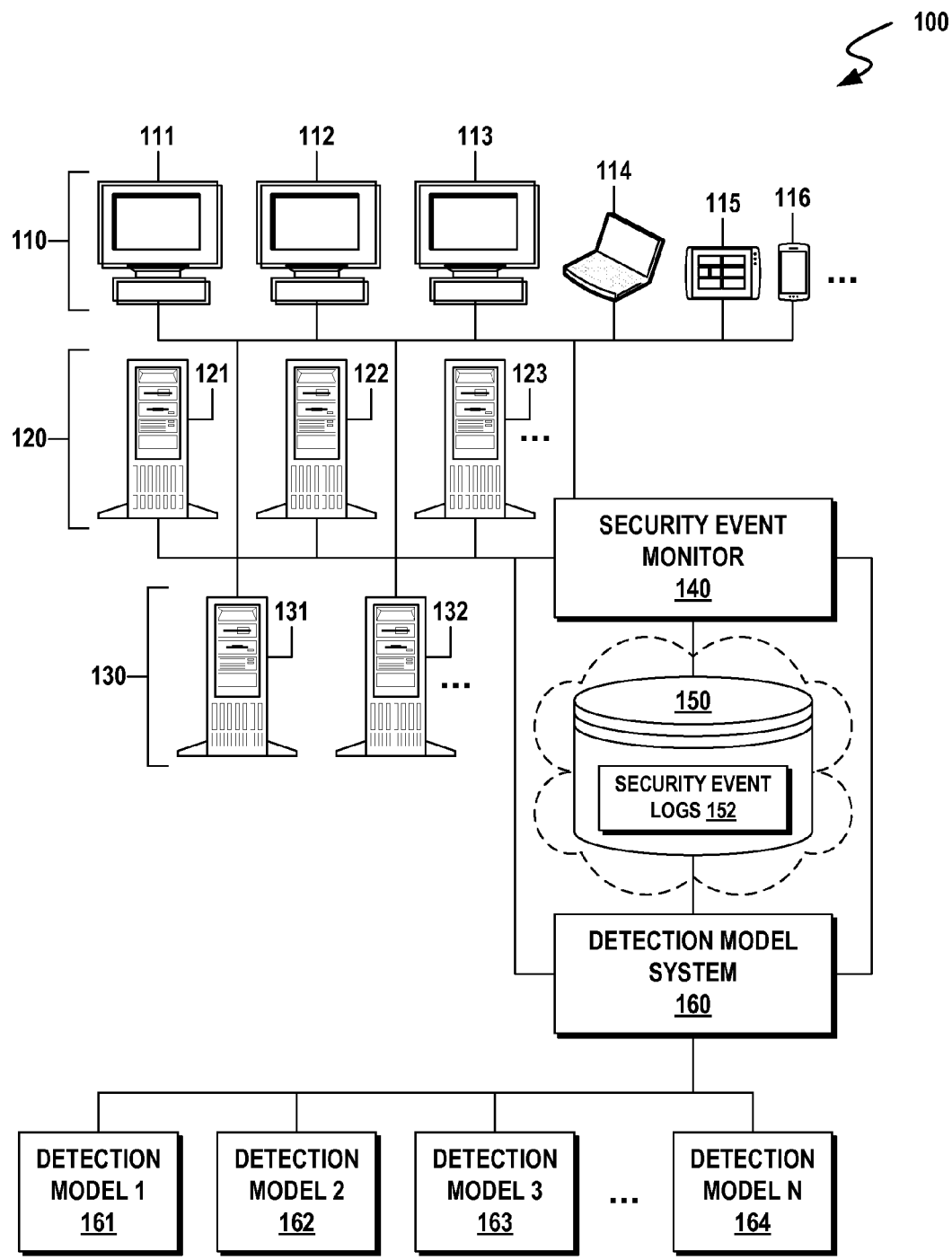
FIG. 1A illustrates an embodiment of an exemplary operating environment that may implement aspects of the described subject matter.

FIG. 1A illustrates an operating environment 100 as an embodiment of an exemplary operating environment that may implement aspects of the described subject matter. It is to be appreciated that aspects of the described subject matter may be implemented by various types of operating environments, computer networks, platforms, frameworks, computer architectures, and/or computing devices.

Operating environment 100 may include user machines 110, server machines 120, and domain machines 130. User machines 110 may include various types of user-facing devices such as workstations 111-113, a laptop computer 114, a tablet device 115, a smartphone 116, and/or other types of computing devices. Server machines 120 may include a plurality of server computers 121-123 configured to provide various types of services. Domain machines 130 may include one or more domain controllers 131, 132 implemented by one or more server computers configured for account management and authentication.

User machines 110, server machines 120, and domain machines 130 may be configured to communicate via any type of network or combination of networks including, without limitation: a wide area network (WAN) such as the Internet, a local area network (LAN), a private network, a public network, a packet network, a circuit-switched network, a wired network, and/or a wireless network. User machines 110, server machines 120, and domain computers 130 may communicate with each other using various communication protocols (e.g., Internet communication protocols, WAN communication protocols, LAN communications protocols, and/or other network communication protocols) and authentication protocols such as Kerberos authentication, NT LAN Manager (NTLM) authentication, Digest authentication, Single Sign-On (SSO) authentication, and/or other authentication protocols.

In various implementations, user machines 110, server machines 120, and domain machines 130 may operate as a computer network of an organization such as an enterprise, business entity, corporate department, service provider, and so forth. In some deployments, machines such as workstations 111-113, server computers 121-123, and domain controllers 131, 132 may be implemented by physical and/or on-premises resources of an organization. In other deployments, one or more of workstations 111-113, server computers 121-123, and/or domain controllers 131, 132 may be implemented as virtual machines hosted by physical resources of a data center in a cloud-computing environment.

When deployed within a computer network, a computing device may be assigned and/or associated with a particular machine role. Exemplary machine roles may include, without limitation: user device, workstation, application server, web server, front-end server, enterprise server, database (e.g., SQL) server, domain controller, Active Directory Domain Services (ADDS), System Center Operations Manager (SCOM), System Center Configuration Manager (SCCM), Windows Server Update Services (WSUS) server, and/or other types of machine roles.

Various types of accounts (e.g., user accounts, service accounts, administrator accounts, etc.) may be established and maintained for allowing controlled access to user machines 110, server machines 120, and/or domain machines 130. Each account may be identified by an account name and may be assigned certain permissions that enable controlled access to particular devices and services within the computer network. To enhance network security, user machines 110, server machines 120, and domain machines 130 may be classified into different network tiers or security zones that require different levels of permissions. For instance, access to workstations 111-113 may require local administrator privileges, while access to server computers 121-123 and domain controllers 131, 132 may require elevated permissions such as server administrator privileges and domain administrator privileges, respectively.

A user may log on to one of user machines 110 (e.g., workstation 111) by supplying a username and credentials such as a plaintext password, for example. In various implementations, the plaintext password supplied by a user may be converted into a password hash value that may be used as authenticating credentials for accessing various services within the computer network. Access among computing devices may be authenticated in various ways such as via password authentication, password hash authentication, SSO authentication, ticket granting ticket (TGT) authentication, and/or other authentication mechanisms.

Various security events may be generated by one or more of: user machines 110, server machines 120, and/or domain machines 130 in response to access attempts, successful accesses, and usage of computer network resources. Security events may be generated in response to various types of activities including, without limitation: account logon/logoff activity, authentication activity, account management activity, process creation/termination activity, directory service activity, object access activity, application activity, file sharing activity, policy change activity, privileged use activity, system event activity, and so forth.

Table 1 shows a small sample of exemplary security events, security event identifiers, and security event data that may be generated by one or more of user machines 110, server machines 120, and/or domain machines 130. The following examples are provided for illustration and are not intended to limit the described subject matter to particular implementations.

TABLE 1

| Security Event | Security Event ID | Security Event Data |
|---|---|---|
| An account was successfully logged on | 4624 | Logon Type, Security ID, Account Name, Account Domain, Logon ID, Logon GUID, Process ID, Process Name, Workstation Name, Source Network Address, Authentication information |
| An account was logged off | 4634 | Logon Type, Security ID, Account Name, Account Domain, Logon ID |
| User initiated logoff | 4647 | Security ID, Account Name, Account Domain, Logon ID |
| A logon was attempted using explicit credentials | 4648 | Logon Type, Security ID, Account Name, Account Domain, Logon ID, Logon GUID, Process ID, Process Name, Workstation Name, Source Network Address, Authentication Information |
| A handle to an object was requested | 4656 | Security ID, Account Name, Account Domain, Logon ID, Object Server, Object Type, Object Name, Handle ID, Resource Attributes, Process ID, Process Name, Access Request Information |
| The handle to an object was closed | 4658 | Security ID, Account Name, Account Domain, Logon ID, Object Server, Handle ID, Process ID, Process Name |
| An attempt was made to access an object | 4663 | Security ID, Account Name, Account Domain, Logon ID, Object Server, Object Type, Object Name, Handle ID, Resource Attributes, Process ID, Process Name, Access Request Information |
| A new process has been created | 4688 | Security ID, Account Name, Account Domain, Logon ID, Process ID, Process Name, Token Elevation Type, Creator Process ID |
| A process has exited | 4689 | Security ID, Account Name, Account Domain, Logon ID, Process ID, Process Name, Exit Status |
| A ticket granting ticket (TGT) was requested | 4768 | Security ID, Account Name, Account Domain, Service Name, Service ID, Client Address, Ticket Information, Certificate Information |
| A service ticket was requested | 4769 | Security ID, Account Name, Account Domain, Service Name, Service ID, Client Address, Ticket Information, Certificate Information |
| . . . | . . . | . . . |

In various implementations, policies for the generation and/or collection of security events may be specified by one or more of domain machines 130 and communicated to user machines 110 and server machines 120. It can be appreciated that an organization typically will be permitted to monitor and collect security event data with respect to computer usage by employees. In some contexts, however, providers and consumers of security event data may employ a variety of mechanisms in the interests of user privacy and information protection. Such mechanisms may include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and so forth.

In various implementations, security events may be generated or logged on an accessed machine and provided to security event monitor 140 for collection and storage. When a security event is provided, a machine may be identified by a machine name and/or network address (e.g., IP address), which can be communicated and correlated to a machine role. When providing security events, a machine may communicate: a machine role, a machine name that includes and/or identifies a machine role, and/or a machine name that can be mapped to a machine role using a list which correlates machine names with machine roles and is available to domain administrators, for example.

Security event monitor 140 may be implemented by a centralized server computer or multiple server computers configured to collect and store security event data that is generated based on activity of the networked devices. Each collected and stored security event may be associated with a timestamp (e.g., MM/DD/YYYY HH:MM:SS) indicating the date and time of the security event. Security event monitor 140 may store security event data in storage system 150 (e.g., data store, database, cloud storage, blob storage, etc.), as security event logs 152 (e.g., log files). In one embodiment, storage system 150 may be implemented by a distributed, scalable storage system configured to store massive amounts of data across a cluster of machines (e.g., server computers). In some implementations, security event logs 152 may be segmented and distributed to machines in a computer cluster or cloud-computing data center.

Security event monitor 140 may be configured to generate alerts and/or alert streams in response to detecting certain types of security events such as unauthorized access attempts, server health issues, running of malicious code, and so forth. However, even when security events such as authentication activity are logged, the lateral movement and/or malicious activity of an attacker that is accomplished using stolen credentials will appear to be normal authenticated activity. In order to detect such attacker activity, a human data analyst would be faced with the heavy burden of having to manually inspect and triage numerous independent security event detections in an attempt to distinguish between benign and malicious "authenticated" activities.

Detection Model System

In accordance with the described subject matter, a detection model system 160 may be provided for building and employing a set of detection models based on security event data (e.g., security event logs 152) in conjunction with account information and/or context information (e.g., machine role). Embodiments of detection model system 160 may be described in the general context of "computer-executable instructions" that are executed to perform various steps, methods, and/or functionality in accordance with aspects of the described subject matter.

Computer-executable instructions may be embodied and/or implemented in various ways such as by a computer program, a software application, software code, application code, source code, executable files, executable components, program modules, routines, application programming interfaces (APIs), functions, methods, objects, properties, data structures, data types, and/or the like.

Computer-executable instructions implemented by detection model system 160 may be executed, for example, by one or more computing devices and/or computer systems that may include one or more processors and storage devices (e.g., memory and disk drives) as well as various input devices, output devices, communication interfaces, and/or other types of devices. Computer-executable instructions implemented by detection model system 160, when executed by a computing device, computer system, and/or processor, may perform particular tasks or implement particular data types in accordance with aspects of the described subject matter. It is to be appreciated that detection model system 160, or portions thereof, may be implemented by software, hardware, firmware or a combination thereof in various embodiments.

In various implementations, detection model system 160 may build and employ a set of detection models (e.g., detection models 1-N), shown in FIG. 1A as detection models 161-164. Each of detection models 161-164 may be configured to provide a separate and independent statistical analysis and/or assessment of security event data (e.g., security event logs 152) for modeling and detecting a certain type of behavior associated with compromised accounts and/or machines.

Detection models 161-164 may be built from training data such as historical security event data (e.g., uncompromised security event data) for a particular time interval (e.g., last 60 days). In various embodiments, detection models 161-164 may implement a base-lining approach without employing classifiers and may be built using unlabeled training data to avoid the expense of generating labels for the security event data.

Each of detection models 161-164 may be defined and/or implemented in terms of counts of various variables taking on particular values in the security event data. Counts may be obtained from security event logs 152 using various types of analysis and/or extraction techniques. In one embodiment, counts may be obtained by submitting queries to and/or running processes on storage system 150, which may be implemented by a cloud-based storage system configured to store massive amounts of data across computer clusters in a data center. After being computed, counts for implementing and/or utilization by detection models 161-164 may be stored as data files in storage system 150 for access and further processing (e.g., estimating and/or calculating values from counts) by one or more local machines.

Storage system 150 may provide an execution environment for computer programs (e.g., data flow applications and/or scripts) to run queries against and/or processes on storage system 150 for obtaining counts. In some implementations, a data flow application may be implemented as a directed acyclic graph (DAG) of vertices or processing nodes that can be scheduled to handle queries against the security event data. Parallel processing jobs may be distributed among various computing resources of the computer cluster or data center to efficiently provide counts from large-scale security event data. Queries for obtaining counts may be implemented by Structured Computations Optimized for Parallel Execution (SCOPE) scripts, Structured Query Language (SQL) and/or relational database management system (RDMS) queries, map-reduce functions, cloud-based dataflow transforms, and/or other types of data requests.

Counts for implementing and/or utilization by detection models 161-164 may be generated from security event data with respect to variables such as account/account type, machine role/role type, logon type, event type, event sequence, event time, and so forth. Particular variables for counts may be based on characteristics of the security event data and/or the computer network being monitored. Detection model system 160 may obtain and/or be provided with a listing of authorized accounts and machine roles from one or more of domain machines 130, security event monitor 140, and/or other networked device.

When computing counts, certain variable values may be aggregated in order to keep the number of different counts to be computed manageable and/or to reduce noise in estimating the probability of very rare combinations of variable values. For example, instead of maintaining a separate count for every account or every machine, counts may be aggregated over certain account types, machine roles/role types, and/or timestamps. In one implementation, timestamps may be bucketed or binned into five minute intervals to convert a timestamp for a particular day into a discrete variable with 288 possible values. Networked machines may be grouped by machine role/role type. Some accounts may be aggregated based on group and/or account privileges (e.g., domain administrators). Certain accounts (e.g., particular administrative and/or service accounts) may require separate counts and may not be aggregated.

Once built, detection models 161-164 may be run against logon session data in various scenarios such as training, testing, or live event monitoring scenarios in order to score logon sessions and scenarios for unusual activity. The logon model may be provided with logon session data obtained and/or received from security event logs 152, security event monitor 140, and/or other networked device or source. The logon session data may be associated with one or more logon sessions that include activities performed by authorized accounts on machines of a computer network. The logon session data may indicate security events (e.g., security event IDs) that occurred during the logon sessions.

The logon session data for a logon session may correspond to a particular account or a particular account/machine pair and include security event data for a particular type of logon event (e.g., Security Event ID 4624, Security Event ID 4648, etc.). Logon session data for a logon session also may include security event data for other security events that were triggered during the logon session. A logon event and other security events that occur during a logon session may be correlated in various ways such as by logon ID and/or logon GUID. Logon session data for a logon session may include an identifier (e.g., machine name, IP address) for each machine that was accessed during the logon session, which can be correlated to a machine role for each accessed machine. In some implementations, the logon session data for a logon session may supply the machine role for each machine that was accessed during the logon session.

Logon ID, Account Instance, Role Instance pairs may be used as unique identifiers of logon sessions.

Detection model system 160 may access calculated counts from storage system 150 and employ one or more of detection models 161-164 to perform various operations to score a logon session. Operations may be performed based on the calculated counts and logon session data to compute one or more calculated or estimated values for each of detection models 161-164. Exemplary calculated or estimated values may include: a ratio of counts, a probability (e.g., conditional probability), a log probability, a negative log probability, a likelihood, a log likelihood, a negative log likelihood, and so forth.

Each calculated or estimated value may be based on historical model data in various forms and may correspond to a particular model feature. In one implementation, the negative log of the historical frequency or probability of certain observed events (e.g., events observed for account/account types, machine roles/role types, times, and/or logon types) may be computed and used to score newly observed logon session events.

The one or more calculated or estimated values for each of detection models 161-164 may represent scores and/or may be normalized to output one or more normalized scores such as z-scores. Each of detection models 161-164 may independently assess if behavior observed in a particular session is suspicious and output one or more normalized or z-scores for the logon session, account, and/or machine. Each normalized or z-score that is output by one of detection models 161-164 may correspond to a particular model feature.

The normalized or z-scores output from each of detection models 161-164 may be combined to calculate an overall ranking score for a logon session, account, and/or machine. The ranking score for each logon session, account, and/or machine may provide a combined assessment of suspicious behavior and may be used to rank and present the top K (e.g., top 10) compromised accounts and/or machines to a human data analyst. The list of ranked alerts may provide the human data analyst with the most relevant alerts for investigation.

The normalized scores or z-scores output by each of detection models 161-164 may be calculated in various ways depending on the configuration of the detection pipeline/combining function. In one or more implementations, the detection pipeline may be configured to use a base-line or weighted average combining function that assigns an equal weight to each z-score based on the total number of z-scores to be combined. For example, each of z-scores $Z_1$-$Z_7$ corresponding to seven features of different detection models (e.g., detection models 161-163) may be assigned a 1/7 weighting and combined as: $1/7*Z_1 + 1/7*Z_2 \ldots + 1/7*Z_7$. In such implementations, each z-score corresponding to a particular model feature may be calculated using the mean and standard deviation statistics from the population of new sessions that are being scored (e.g., session data for the current day) for the particular model feature.

In one or more implementations, the detection pipeline may be configured to use a combining function that assigns feature weights based on a trained model using machine learning. The trained model may receive negative log probabilities from each of the model features as training input and may output a learned weight for each model feature. The trained model also may output mean and standard deviation statistics for each particular model feature from the training population (e.g., model training data) for the particular model feature. The mean and standard deviation for a particular model feature then may be used to normalize a session score (e.g., negative log probability) in the form of a z-score for the particular model feature. For example, z-score $Z_1$ may be calculated as $(x_1-\mu_1)/\sigma_1$, where: $x_1 = -\text{Log}(P(R|A))$, $\mu_1 = \text{Mean}(\text{Model1}(-\text{Log}(R|A)))$, and $\sigma_1 = \text{SDEV}(\text{Model1}(-\text{Log}(R|A)))$. The mean and standard deviation statistics from the training data for each of the model features may be used for mean centering probabilities to provide z-scores, which can be combined using learned model weights. The combining function may apply the learned weights and combine z-scores (e.g., $W_1Z_1 + W_2Z_2 \ldots + W_7Z_7$) to produce a final weighted ranking score.

The combining function may be trained, tested, evaluated, and/or refined based on feedback from the human data analyst and/or machine learning. In various implementations, feature weights for the combining function may be assigned and/or updated based on feedback from a human data analyst so that the combining function learns and improves over time. For example, logon sessions evaluated by the human data analyst may be labeled as malicious or benign and used as training data for the combining function. Feedback from the human data analyst regarding detections may be used to train and refine the combining function so that higher fidelity alerts are triggered. The past experiences and/or preferences of human data analyst may provide valuable insight for enabling detection model system 160 to perform in-depth analysis of compromised account/machine behavior and to deliver the most relevant alerts. Training, testing, and/or evaluating the combining function may be performed using various statistical and/or machine-learning techniques such as cross-validation (e.g., five-fold cross-validation) and supervised machine learning that employs gradient descent algorithms and a neural network model to learn ranking functions.

After the training phase, feature weights (e.g., assigned, updated, and/or refined) for each of the normalized scores may be published to and employed by the combining function. The mean and standard deviation from 100% of the training data also may be published with each of the feature weights to normalize newly observed negative log probabilities against the model population so that weights can be applied and the final ranking score can be computed.

Detection model system 160 and the combining function may be extensible to support additional types of detections that provide meaningful insight. New detection models may be added to expand the scope of detections, and normalized scores output by a new detection model may be combined with the normalized scores output by existing detection models. Furthermore, existing detection models that are determined to be unimportant (e.g., having feature weights below a threshold) may be removed or replaced. As such, detection model system 160 may evolve over time to adapt to changing attack tactics.

In addition to providing a ranked listing of compromised accounts and/or machines, detection model system 160 may automatically generate and output an attack graph. In various implementations, the attack graph may display a visual representation of nodes and edges that graphically illustrates probable paths (e.g., top K paths) that an attacker may have traveled. Each compromised account/machine pair that has been identified may be used as a node of the attack graph. Detection model system 160 may probabilistically estimate possible attack paths among the nodes and perform further refinements to produce the top K probable paths that an attacker could have traversed.

Detection models 161-164 may be configured to provide multiple independent assessments of security event data (e.g., security event logs 152) for modeling and detecting certain types of behaviors associated with compromised accounts/machines. An account/machine that has been compromised using stolen credential typically will have activities (e.g., security events) that are different from other accounts/machines of the same type and that are different from the historical activity of the account/machine in question. For example, a compromised account/machine that uses stolen credentials may log on in a different way or strange time, access new machines or execute new processes that trigger unexpected sequences of events, dwell on or rapidly trigger events in an unusual manner, oddly change an operating context by elevating privileges, and so forth. In various implementations, detection models 161-164 may model different types of historical behavior and employ probabilistic techniques to estimate and detect whether an account/machine is exhibiting compromised behavior.

Logon Model

In one embodiment, detection model 161 (detection model 1) may be implemented as a logon model. The logon model may be configured as a probabilistic intrusion detection model computed to model logon behavior based on account/account type (A), machine role/role type (R), time (T) and logon type (L).

Detection model system 160 may build the logon model by determining a set of account/account types, a set of determined machine roles/role types, a set of times, and a set of logon types. The set of account/account types may be derived from authorized accounts associated with a monitored computer network. In various implementations, some authorized accounts may be grouped by account type. Exemplary account types may include: user/human accounts, machine/automated accounts, service accounts, administrator accounts, department-based accounts, team-based accounts, role-based accounts, job type-based accounts, privilege-based accounts, and/or other type of grouping or clustering of authorized accounts. The set of machine roles/role types may be derived from machine roles (e.g., user device, workstation, application server, web server, front-end server, enterprise server, database (e.g., SQL) server, domain controller, ADDS, SCOM, SCCM, WSUS, etc.) assigned to machines of the monitored computer network. Machines in the monitored computer network may be grouped by machine role/role type.

The set of times may be derived by converting (e.g., bucketing or binning) a day into time intervals, such as five minute intervals, so that each day has a set of possible time index values (e.g., 288 possible bucket index values per day). The set of logon types may be derived from the ways in which a user and/or account can log on to a particular machine, such as by physically logging on to a local computer, logging on to a computer from the network, remotely logging on to a computer, and so forth. In one implementation, logon types may include: interactive logon (Type 2), network logon (Type 3), batch logon (Type 4), service logon (Type 5), proxy logon (Type 6), unlock workstation (Type 7), network clear text logon (Type 8), new credentials logon (Type 9), remote interactive logon (Type 10), cached interactive logon (Type 11), cached remote interactive logon (Type 12), or cached unlock logon (Type 13).

Detection model system 160 may compute the logon model by obtaining counts from security event data contained in security event logs 152 maintained in storage system 150. A time period may be specified for security event logs 152 and/or security event logs 152 may have a finite duration for storage. Storage system 150 may be configured to handle complex processing of queries and/or scripts run against terabytes of security event data. After calculation, counts may be stored as data files in storage system 150 for further processing.

In one implementation, the logon model may be computed by obtaining the number of times every possible combination of (A, R, T, L) was observed among all the occurrences of a successful logon (e.g., Security Event ID 4624) in the security event data. Detection model system 160 may query the security event data for a count of successful logon events (e.g., occurrences of Security Event ID 4624) observed for each combination of account/account type, machine role/role type, logon type, and time bucket index.

Table 2 shows exemplary output of counts for exemplary combinations of account type, machine role type, logon type, time bucket index, and day of week. The following examples are provided for illustration and are not intended to limit the described subject matter to particular implementations.

TABLE 2

| Account Type | Role Type | Logon Type | Time of Day (e.g., 5-min bucket index) | Day of week | Count of Event ID 4624 |
|---|---|---|---|---|---|
| _SPOGMSvc | ADDS | 3 | 1 | 1 | 2000 |
| _SPOGMSvc | ADDS | 3 | 2 | 1 | 2000 |
| ... | ... | ... | ... | ... | ... |

The logon model may be employed to determine how likely it is for an account/account type to logon to a particular machine role/role type at a particular time. The logon model may estimate the probability or likelihood that a successful logon event (e.g., Security Event ID 4624) occurs for an account type (A) on a machine role type (R) at a particular time bucket (T) with a particular logon type (LT). As compromised accounts may log on to different machines and/or log on differently than they generally do, the logon model may be utilized to determine whether a particular logon event makes sense.

The logon model may be employed to score logon sessions in various scenarios such as training, testing, or live event monitoring scenarios. The logon model may be provided with logon session data obtained and/or received from security event logs 152, security event monitor 140, and/or other networked device or source. The logon session data may be associated with one or more logon sessions that include activities performed by authorized accounts on machines of a computer network. The logon session data may indicate security events (e.g., security event IDs) that occurred during the logon sessions.

The logon session data for a logon session may correspond to a particular account or a particular account/machine pair and include security event data for a successful logon event (e.g., Security Event ID 4624). Logon session data for a logon session also may include security event data for other security events that were triggered during the logon session. A logon event and other security events that occur during a logon session may be correlated in various ways such as by logon ID and/or logon GUID. Logon session data for a logon session may include an identifier (e.g., machine name, IP address) for each machine that was accessed during the logon session, which can be correlated to a machine role for each accessed machine. In some implementations, the logon session data for a logon session may supply the machine role for each machine that was accessed during the logon session. Logon ID, Account Instance, Role Instance pairs may be used as unique identifiers of logon sessions.

Detection model system 160 may access calculated counts from storage system 150 and employ the logon model to perform various operations to score a logon session. Operations may be performed based on the calculated counts and logon session data to compute one or more calculated or estimated values. Exemplary calculated or estimated values may include: a ratio of counts, a probability (e.g., conditional probability), a log probability, a negative log probability, a likelihood, a log likelihood, a negative log likelihood, and so forth.

Each calculated or estimated value may correspond to a particular model feature. In one implementation, the negative log of the historical frequency or probability of certain observed events (e.g., successful logon events observed for account/account types, machine roles/role types, times, and/or logon types) may be computed and used to score a newly observed event (e.g., newly observed Security Event ID 4624) in a logon session.

The one or more calculated or estimated values may represent scores and/or may be normalized to output one or more normalized scores such as z-scores. The one or more normalized scores (e.g., z-scores) may provide an independent assessment of whether the behavior observed in a particular session is indicative of compromised behavior. Each normalized or z-score that is output by the logon model may correspond to a particular model feature. The one or more normalized scores or z-scores that are output by the logon model also may be combined with other normalized scores or z-scores that are output from one or more other detection models (e.g., detection models 162-164) to provide a ranking score for the logon session, account, and/or machine.

The normalized scores or z-scores output by the logon model may be calculated in various ways. When base-line weighting is employed, the mean and standard deviation statistics from the session data of the current scoring day for each model feature may be used to normalize session scores. When trained feature weights are employed, the mean and standard deviation statistics from the model training data for a particular model feature may be used to normalize session scores.

In various implementations, detection model system 160 may employ the logon model to score a logon session that includes a successful logon event (e.g., Security Event ID 4624) for a particular account type (A) on a machine having a particular machine role type (R) at a particular time bucket (T) with a particular logon type (LT). In one exemplary implementation, detection model system 160 may employ the logon model to score the logon session by outputting one or more of:

a z-score ($Z_1$) based on the negative log of the conditional probability of a particular role type observing the successful logon event given a particular account type, $-\text{Log}(P(R|A))$ in the range of 0 . . . 100;

a z-score ($Z_2$) based on the negative log of the conditional probability of a particular account type observing the successful logon event given a particular role type, $-\text{Log}(P(A|R))$ in the range of 0 . . . 100;

a z-score ($Z_3$) based on the negative log of the conditional probability of a particular logon type observing the successful logon event given a particular role type, $-\text{Log}(P(LT|R))$ in the range of 0 . . . 100; and a z-score ($Z_4$) based on the negative log of the conditional probability of a particular logon type observing the successful logon event given a particular account type, $-\text{Log}(P(LT|A))$ in the range of 0 . . . 100.

If a historical occurrence of the combinations described above is not found when scoring a newly observed successful logon event (e.g., Security Event ID 4624), a maximum $-\text{Log}$ score of 100 may be used to represent a never before seen event.

Event Sequence Model

In one embodiment, detection model 162 (detection model 2) may be implemented as an event sequence model. The event sequence model may be configured as a probabilistic intrusion detection model computed to model logon session behavior based on account/account type (A) and/or machine role/role type (R).

Detection model system 160 may build the event sequence model by determining a set of account/account types, a set of determined machine roles/role types, and a set of event sequences. The set of account/account types may be derived from authorized accounts associated with a monitored computer network. In various implementations, some authorized accounts may be grouped by account type. Exemplary account types may include: user/human accounts, machine/automated accounts, service accounts, administrator accounts, department-based accounts, team-based accounts, role-based accounts, job type-based accounts, privilege-based accounts, and/or other type of grouping or clustering of authorized accounts. The set of machine roles/role types may be derived from machine roles assigned to machines of the monitored computer network. Machines in the monitored computer network may be grouped by machine role/role type.

The set of event sequences may be derived from possible security events that may be generated by one or more of: user machines 110, server machines 120, and/or domain machines 130 in response to access attempts, successful accesses, and usage of computer network resources. Security events may correspond to various types of activities including, without limitation: account logon/logoff activity, authentication activity, account management activity, process creation/termination activity, directory service activity, object access activity, application activity, file sharing activity, policy change activity, privileged use activity, system event activity, and so forth. The set of event sequences may be based on a complete or partial list of all possible security events that may be generated.

In various embodiments, event sequences may be implemented as N-gram security event sequences using an N-gram model. For example, if length N=3, and if 160 possible security events are selected for monitoring, then there would be are at most $160^3$ (~4.1 million) possible event sequences of length three. Higher values of N require a larger number of counts to be computed, which increases computation and storage. Also, if the amount of history used to compute counts is not long enough to observe certain rare sequences enough times to estimate their probabilities reliably, the resulting N-gram model could be noisy. While not limited in this respect, length N typically may be four or less.

When using an N-gram model, the counts of all possible sequences may be computed. In addition, counts may be computed based on each account/account type (A) and/or each machine role/role type (R). To reduce the expense of computing the event sequence model, certain accounts/accounts types or machine roles/role types may be selected from the possible choices and/or counts may be aggregated based on account/account type-role/role type (A-R) pairs in various implementations. Once the choices for length N and for account/account type and/or role/role type are made, counts may obtained for the number of times every possible security event ID sequence of length N has occurred in the logon sessions for that account/account type and/or role/role type in the security event data (e.g., security event logs 152).

Detection model system 160 may compute the event sequence model by obtaining counts from security event data contained in security event logs 152 maintained in storage system 150. In one implementation, the event sequence model may be computed by obtaining the number of times all possible N-gram security event sequences have been observed, where the N-gram security event sequence occurs within the same logon session. Detection model system 160 may query the security event data for a count of each possible N-gram security event sequence (e.g., trigram sequence of security event IDs) observed in the logon sessions for an account/account type, a machine role/role type, and/or an account/account type-role/role type pair.

Table 3 shows exemplary output of counts aggregated over all logon sessions for an exemplary account type-role type pair. The following examples are provided for illustration and are not intended to limit the described subject matter to particular implementations.

TABLE 3

| Account Type | Role Type | 4-gram event sequence (observed in a logon session) | Count (aggregated over all logon sessions for the account type-role type pair) |
|---|---|---|---|
| _SPOGMSvc | ADDS | $E_{121}, E_{43}, E_{35}, E_{156}$ | 3 |
| _SPOGMSvc | ADDS | $E_9, E_1, E_{145}, E_{98}$ | 2 |
| _SPOGMSvc | ADDS | $E_{98}, E_9, E_{145}, E_1$ | 4 |
| . . . | . . . | . . . | . . . |

The event sequence model may be employed to determine how likely it is for an account/account type to generate the observed sequence of events. The event sequence model may be used to estimate the probability of an event sequence in a logon session. The event sequence model may use N-grams (e.g., trigrams) of security event sequences, for a given account type (A) on a machine role type (R), to estimate the probability or likelihood of the entire N-gram security event sequence occurring. As compromised accounts perform different activities than they have in the past and/or deviate from the norm for an account type on a role type, the event sequence model may be utilized to determine whether an observed sequence of events makes sense.

The event sequence model may be employed to score logon sessions in various scenarios such as training, testing, or live event monitoring scenarios. The event sequence model may be provided with logon session data obtained and/or received from security event logs 152, security event monitor 140, and/or other networked device or source. The logon session data may be associated with one or more logon sessions that include activities performed by authorized accounts on machines of a computer network. The logon session data may indicate security events (e.g., security event IDs) that occurred during the logon sessions.

The logon session data for a logon session may correspond to a particular account or a particular account/machine pair and include security event data for security events that were triggered during the logon session. Security events may be correlated within a logon session in various ways, such as by logon ID and/or logon GUID. Logon session data for a logon session may include a machine identifier (e.g., machine name, IP address, etc.) that can be mapped to a machine role and/or may supply the machine role for each machine that was accessed during the logon session. Logon ID, Account Instance, Role Instance pairs may be used as unique identifiers of logon sessions.

Detection model system 160 may access calculated counts from storage system 150 and employ the logon model to perform various operations to score a logon session. Operations may be performed based on the calculated counts and logon session data to compute one or more calculated or estimated values. Exemplary calculated or estimated values may include: a ratio of counts, a probability (e.g., conditional probability), a log probability, a negative log probability, a likelihood, a log likelihood, a negative log likelihood, and so forth. In one implementation, given a sequence of security event IDs $\{E_1, E_2, \ldots, E_N\}$ within a logon session, the sequence event model may use an N-gram model to estimate the probability of observing the sequence of security event IDs.

Each calculated or estimated value may correspond to a particular model feature. In one implementation, the negative log of the historical frequency or probability of certain observed events (e.g., security event sequences observed for account/account types and/or machine roles/role types) may be computed and used to score a newly observed event (e.g., newly observed security event sequence) in a logon session.

When learning the historical frequencies of an N-gram (e.g., trigram) event sequence, the historical probability may be divided by the null hypothesis. For example, the historical probability P(A|R) may be divided by MAX(P|R), which is the most probable combination of A|R. The value for −Log (P(A|R)/MAX(P|R)) for this N-gram event sequence will be zero. Therefore, when the most probable N-gram security event sequence is observed in new data, it will contribute zero to the overall model session score whenever that N-gram security event sequence is encountered.

The one or more calculated or estimated values may represent scores and/or may be normalized to output one or more normalized scores such as z-scores. The one or more normalized scores (e.g., z-scores) may provide an independent assessment of whether the behavior observed in a particular session is indicative of compromised behavior. Each normalized or z-score that is output by the logon model may correspond to a particular model feature. The one or more normalized scores or z-scores that are output by the event sequence model also may be combined with other normalized scores or z-scores that are output from one or more other detection models (e.g., detection models 161, 163, 164) to provide a ranking score for the logon session, account, and/or machine.

The normalized scores or z-scores output by the event sequence model may be calculated in various ways. When base-line weighting is employed, the mean and standard deviation statistics from the session data of the current scoring day for each model feature may be used to normalize session scores. When trained feature weights are employed, the mean and standard deviation statistics from the model training data for a particular model feature may be used to normalize session scores.

In various implementations, detection model system 160 may employ the logon model to score a logon session that includes an N-gram security event sequence (e.g., $E_1, E_2, \ldots, E_N$) for a particular account type (A) on a machine having a particular machine role type (R). In one exemplary implementation, detection model system 160 may employ the logon model to score the logon session by outputting one or more of:

a z-score ($Z_5$) based on the negative log of the conditional probability of a particular role type observing a particular security event sequence $E_N, \ldots, E_1$ given a particular account type, $-\text{Log}(P(E_N, \ldots, E_1, |A))$ in the range of 0 . . . 100; and a z-score ($Z_6$) based on the negative log of the conditional probability of a particular account type observing a particular security event sequence $E_N, \ldots, E_1$ given a particular role type, $-\text{Log}(P(E_N, \ldots, E_1, |R))$ in the range of 0 . . . 100.

Z-scores $Z_5$ and $Z_6$ may be calculated using the chain rule and trigram approximation to avoid complexity from the chain rule. Each newly observed N-gram security event sequence that was the most probable historically will compute a $-\text{Log}$ score of zero. If a historical occurrence of the combinations described above is not found when scoring a newly observed security event sequence, a maximum $-\text{Log}$ score of 100 may be used to represent a never before seen event.

Inter-event Time Model

In one embodiment, detection model 162 (detection model 2) may be implemented as an inter-event time model. The inter-event time may be configured as a probabilistic intrusion detection model computed to model logon session behavior based on account/account type (A).

Detection model system 160 may build the inter-event time model by determining a set of account/account types and a set of inter-event time intervals. The set of account/account types may be derived from authorized accounts associated with a monitored computer network. In various implementations, some authorized accounts may be grouped by account type. Exemplary account types may include: user/human accounts, machine/automated accounts, service accounts, administrator accounts, department-based accounts, team-based accounts, role-based accounts, job type-based accounts, privilege-based accounts, and/or other types of grouping or clustering of authorized accounts.

The set of inter-event time intervals may be derived by discretizing inter-event time durations into buckets of a pre-defined duration $D_B$ (e.g. 1 second) and setting a maximum possible inter-event time duration $D_{max}$ (e.g. 1000 seconds) to be modeled. The set of inter-event time intervals may include $D_{max}/D_B$ discrete inter-event time intervals or buckets.

A logon session may include a sequence of security events and/or security event IDs. Security events may correspond to various types of activities including, without limitation: account logon/logoff activity, authentication activity, account management activity, process creation/termination activity, directory service activity, object access activity, application activity, file sharing activity, policy change activity, privileged use activity, system event activity, and so forth.

Given a sequence of all the event IDs ($E_1, E_2, \ldots, E_N$) within a logon session and their corresponding raw, non-binned, timestamps ($T_1, T_2, \ldots, T_N$), inter-event durations $\{D_1, D_2, \ldots, D_{N-1}\}$ may be computed where $D_i = T_{i+1} - T_i$. Then, counts are obtained for the number of observed inter-event durations in various buckets defined by $D_B$ and $D_{max}$. Counts may be computed separately for various account types. For each account/account type, a set of counts (e.g., one count per bucket) may be output.

Detection model system 160 may compute the event sequence model by obtaining counts from security event data contained in security event logs 152 maintained in storage system 150. In one implementation, the event sequence model may be computed by obtaining the number of times all possible inter-event time intervals have been observed within a logon session. Detection model system 160 may query the security event data for a count of each possible inter-event time interval observed in the logon sessions for an account/account type.

Table 4 shows exemplary output of counts for an exemplary account and bucket index based on a bucket duration $D_B=1$ second and a maximum duration $D_{max}=1000$ seconds. It is to be understood that the following examples are provided for illustration and are not intended to limit the described subject matter to particular implementations.

TABLE 4

| Account Type | Bucket index (1 to 1000) | Count |
|---|---|---|
| _SPOGMSvc | 1 | 1234 |
| _SPOGMSvc | 10 | 0 |
| OPS/OCE/Admin. | 1 | 0 |
| OPS/OCE/Admin. | 10 | 345 |
| . . . | . . . | . . . |

The inter-event time model may be employed to determine how likely it is for an account/account type to generate events in a time interval. The inter-event time model may be used to estimate the probability of an inter-event time duration occurring in a logon session. The inter-event time model may use an inter-event time duration between security events for a given account type (A) to estimate the probability or likelihood that security events are being automatically generated to distinguish between the behavior of human and automated accounts. As uncompromised user accounts have high inter-event time intervals as compared to a service account that automates, the inter-event model may be utilized to determine whether a user account is automatically generating events (e.g., malware script activities) and/or a service account is being manipulated by a human attacker.

The inter-event time model may be employed to score logon sessions in various scenarios such as training, testing, or live event monitoring scenarios. The inter-event time model may be provided with logon session data obtained and/or received from security event logs 152, security event monitor 140, and/or other networked device or source. The logon session data may be associated with one or more logon sessions that include activities performed by authorized accounts on machines of a computer network. The logon session data may indicate security events (e.g., security event IDs) that occurred during the logon sessions.

The logon session data for a logon session may correspond to a particular account or a particular account/machine pair and include security event data for security events that were triggered during the logon session. Security events may be correlated within a logon session in various ways, such as by logon ID and/or logon GUID. Logon session data may include a machine identifier (e.g., machine name, IP address) that can be mapped to a machine role and/or may supply the machine role for each machine that was accessed during the logon session. Logon ID, Account Instance, Role Instance pairs may be used as unique identifiers of logon sessions.

Detection model system 160 may access calculated counts from storage system 150 and employ the inter-event time model to perform various operations to score a logon session. Operations may be performed based on the calculated counts and logon session data to compute one or more calculated or estimated values. Exemplary calculated or estimated values may include: a ratio of counts, a probability (e.g., conditional probability), a log probability, a negative log probability, a likelihood, a log likelihood, a negative log likelihood, and so forth. In one implementation, given a sequence of security event IDs $\{E_1, E_2, \ldots, E_N\}$ within a logon session, the inter-event time model may estimate the probability of observing a particular inter-event time duration.

Each calculated or estimated value may correspond to a particular model feature. In one implementation, the negative log of the historical frequency or probability of certain observed events (e.g., inter-event time durations observed for account/account types) may be computed and used to score a newly observed event (e.g., inter-event time duration) in a logon session The one or more calculated or estimated values may represent scores and/or may be normalized to output one or more normalized scores such as z-scores. The one or more normalized scores (e.g., z-scores) may provide an independent assessment of whether the behavior observed in a particular session is indicative of compromised behavior. Each normalized or z-score that is output by the logon model may correspond to a particular model feature. The one or more normalized scores or z-scores that are output by the inter-event time model also may be combined with other normalized scores or z-scores that are output from one or more other detection models (e.g., detection models 161, 162, 164) to provide a ranking score for the logon session, account, and/or machine.

The normalized scores or z-scores output by the inter-event time model may be calculated in various ways. When base-line weighting is employed, the mean and standard deviation statistics from the session data of the current scoring day for each model feature may be used to normalize session scores. When trained feature weights are employed, the mean and standard deviation statistics from the model training data for a particular model feature may be used to normalize session scores.

In various implementations, detection model system 160 may employ the inter-event time model to score a logon session that includes a security event sequence (e.g., $E_1, E_2, \ldots, E_N$) for a particular account type (A). In one exemplary implementation, detection model system 160 may employ the logon model to score the logon session by outputting: a z-score ($Z_7$) based on the negative log of the probability of a particular account type observing a particular inter-event time interval, $-Log (P(A))$ in the range of 0 . . . 100.

If a historical occurrence of the combinations described above is not found when scoring a newly observed inter-event time duration, a maximum –Log score of 100 may be used to represent a never before seen event.

Explicit Credentials Model

In one embodiment, detection model 164 (detection model N) may be implemented as an explicit credentials model. The logon model may be configured as a probabilistic intrusion detection model computed to model logon behavior based on account/account type (A), machine role/role type (R), and time (T).

Detection model system 160 may build the explicit credentials model by determining a set of account/account types, a set of determined machine roles/role types, and a set of times. The set of account/account types may be derived from authorized accounts associated with a monitored computer network. In various implementations, some authorized accounts may be grouped by account type. Exemplary account types may include: user/human accounts, machine/automated accounts, service accounts, administrator accounts, department-based accounts, team-based accounts, role-based accounts, job type-based accounts, privilege-based accounts, and/or other type of grouping or clustering of authorized accounts. The set of machine roles/role types may be derived from machine roles assigned to machines of the monitored computer network. Machines in the monitored computer network may be grouped by machine role/role type. The set of times may be derived by converting (e.g., bucketing or binning) a day into time intervals, such as five minute intervals, so that each day has a set of possible time index values (e.g., 288 possible bucket index values per day).

Detection model system 160 may compute the explicit credentials model by obtaining counts from security event data contained in security event logs 152 maintained in storage system 150. In one implementation, the logon model may be computed by obtaining the number of times every possible combination of (A, R, T) was observed among all the occurrences of a logon attempt using explicit credentials (e.g., Security Event ID 4648) in the security event data. Detection model system 160 may query the security event data for a count of logon attempts using explicit credentials (e.g., occurrences of Security Event ID 4648) observed for each combination of account/account type, machine role/role type, and time bucket index.

Table 5 shows exemplary output of counts for exemplary combinations of account type, machine role type, time bucket index, and day of week. The following examples are provided for illustration and are not intended to limit the described subject matter to particular implementations.

TABLE 5

| Account Type | Role Type | Time of Day 5-min bucket index | Day of week | Count of Event ID 4648 |
|---|---|---|---|---|
| _SPOGMSvc | ADDS | 1 | 1 | 2000 |
| _SPOGMSvc | ADDS | 2 | 1 | 2000 |
| . . . | . . . | . . . | . . . | . . . |

The explicit credentials model may be employed to determine how likely it is for an account/account type to switch credentials, for example, on a particular role/role type at a particular time. The explicit credentials model may estimate the probability or likelihood that an account type (A) attempts a logon using explicit credentials (e.g., performs a "Run as administrator" manifested as Security Event ID 4648) on a machine role type (R) at a particular time bucket (T). As attackers may change context and/or elevate themselves during lateral movement, the explicit credentials model may be utilized to determine whether credential elevation is unusual. In a data center setting, credential elevation should be a rare occurrence.

The explicit credentials model may be employed to score logon sessions in various scenarios such as training, testing, or live event monitoring scenarios. The explicit credentials model may be provided with logon session data obtained and/or received from security event logs 152, security event monitor 140, and/or other networked device or source. The logon session data may be associated with one or more logon sessions that include activities performed by authorized accounts on machines of a computer network. The logon session data may indicate security events (e.g., security event IDs) that occurred during the logon sessions.

The logon session data for a logon session may correspond to a particular account or a particular account/machine pair and include security event data for a logon attempt using explicit credentials (e.g., Security Event ID 4648). Logon session data for a logon session also may include security event data for other security events that were triggered during the logon session. Security events may be correlated within a logon session in various ways, such as by logon ID and/or logon GUID. Logon session data for a logon session may include a machine identifier (e.g., machine name, IP address) that can be mapped to a machine role and/or may supply the machine role for each machine that was accessed during the logon session. Logon ID, Account Instance, Role Instance pairs may be used as unique identifiers of logon sessions.

Detection model system 160 may access calculated counts from storage system 150 and employ the explicit credentials model to perform various operations to score a logon session. Operations may be performed based on the calculated counts and logon session data to compute one or more calculated or estimated values. Exemplary calculated or estimated values may include: a ratio of counts, a probability (e.g., conditional probability), a log probability, a negative log probability, a likelihood, a log likelihood, a negative log likelihood, and so forth.

Each calculated or estimated value may correspond to a particular model feature. In one implementation, the negative log of the historical frequency or probability of certain observed events (e.g., logon attempts using explicit credentials for account/account types, machine roles/role types, and/or times) may be computed and used to score a newly observed event (e.g., newly observed Security Event ID 4648) in a logon session The one or more calculated or estimated values may represent scores and/or may be normalized to output one or more normalized scores such as z-scores. The one or more normalized scores (e.g., z-scores) may provide an independent assessment of whether the behavior observed in a particular session is indicative of compromised behavior. Each normalized or z-score that is output by the logon model may correspond to a particular model feature. The one or more normalized scores or z-scores that are output by the explicit credentials model also may be combined with other normalized scores or z-scores that are output from one or more other detection models (e.g., detection models 161-163) to provide a ranking score for the logon session, account, and/or machine.

The normalized scores or z-scores output by the explicit credentials model may be calculated in various ways. When base-line weighting is employed, the mean and standard deviation statistics from the session data of the current scoring day for each model feature may be used to normalize session scores. When trained feature weights are employed, the mean and standard deviation statistics from the model training data for a particular model feature may be used to normalize session scores.

In various implementations, detection model system 160 may employ the explicit credentials model to score a logon session that includes a logon attempt using explicit credentials (e.g., Security Event ID 4648) for a particular account type (A) on a machine having a particular machine role type (R) at a particular time bucket (T). In one exemplary implementation, detection model system 160 may employ the explicit credentials model to score the logon session by outputting one or more of:

a z-score ($Z_8$) based on the negative log of the conditional probability of a particular role type observing the logon attempt using explicit credentials given a particular account type, $-\text{Log}(P(R|A))$ in the range of 0 . . . 100; and a z-score ($Z_9$) based on the negative log of the conditional probability of a particular account type observing a logon attempt using explicit credentials given a particular role type, $-\text{Log}(P(A|R))$ in the range of 0 . . . 100.

If a historical occurrence of the combinations described above is not found when scoring a newly observed logon attempt using explicit credentials, a maximum −Log score of 100 may be used to represent a never before seen event.

Exemplary Architecture

Figure 1B:
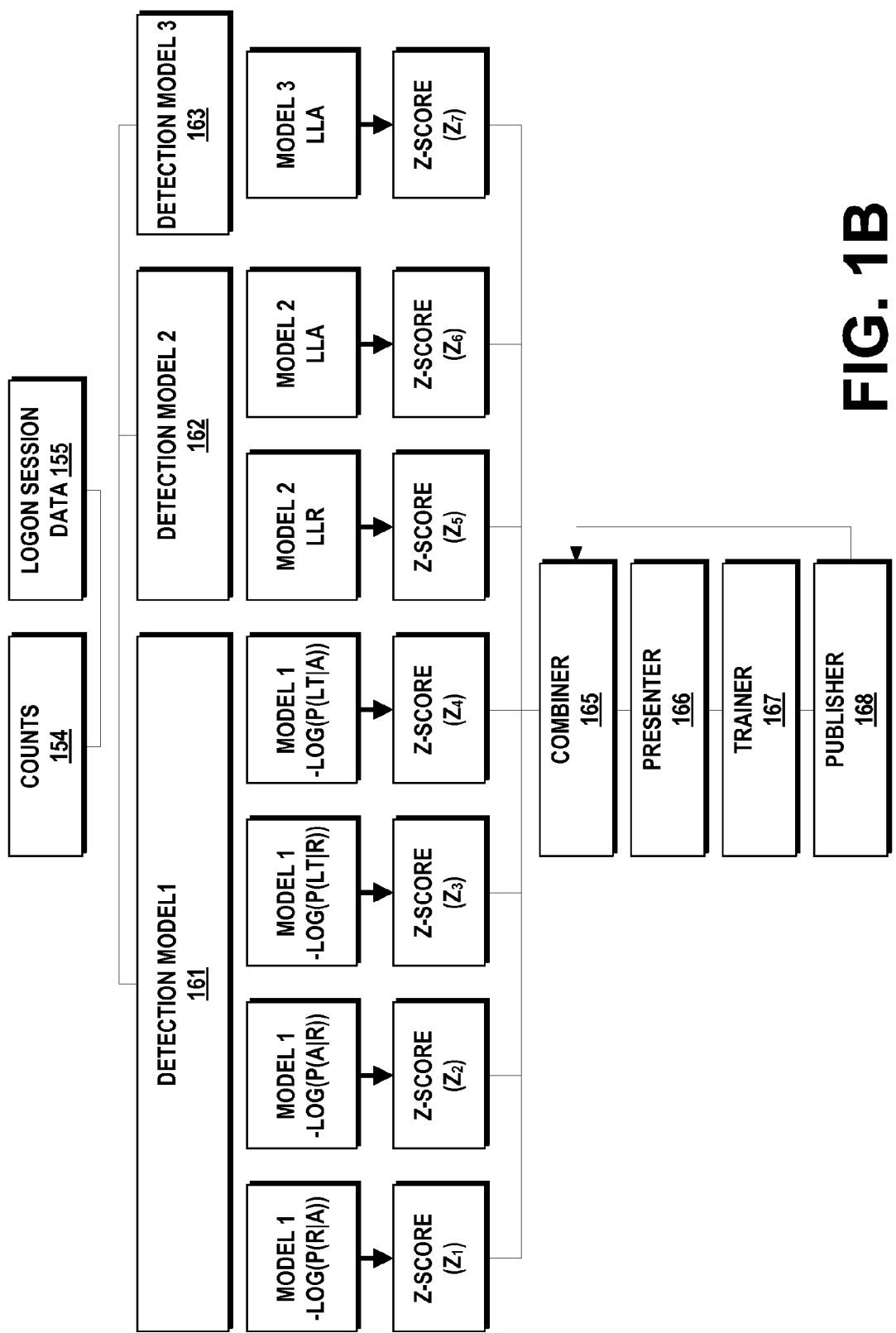
FIG. 1B illustrates an embodiment of an exemplary architecture in accordance with aspects of the described subject matter.

FIG. 1B illustrates an embodiment of an exemplary architecture for lateral movement detection in accordance with aspects of the described subject matter. The exemplary architecture, or portions thereof, may be implemented by detection model system 160. It is to be appreciated that the exemplary architecture, or portions thereof, may be implemented by one or more computing devices, computer-executable instructions, software, hardware, firmware or a combination thereof in various embodiments.

Different detection models 161-163 may include a logon model, an event sequence model, and an inter-event time model. Detection models 161-163 may be defined and/or implemented in terms of counts 154 generated from security event data with respect to variables such as account/account type, machine role, logon type, event type, event sequence, event time, and so forth.

Counts 154 may include: a count of successful logon events (e.g., occurrences of Security Event ID 4624) observed for each combination of account/account type, machine role, logon type, and time bucket index; a count of each possible N-gram security event sequence (e.g., trigram sequence of security event IDs) observed in the logon sessions for an account/account type, machine role, and/or account-role pair; and a count of each possible inter-event time interval observed in the logon sessions for an account/account type. Counts 154 may be accessed from storage system 150, for example.

Different detection models 161-163 may be provided with logon session data 155 obtained and/or received from security event logs 152, security event monitor 140, and/or other networked device or source. The logon session data 155 may be associated with one or more logon sessions that include activities performed by authorized accounts on machines of a computer network. The logon session data 155 may indicate security events (e.g., security event IDs) that occurred during the logon sessions.

Logon session data 155 for a logon session may indicate security events that were triggered during the logon session and that are correlated to the logon session via logon ID and/or logon GUID. Logon session data 155 for a logon session may include a machine identifier (e.g., machine name, IP address) that maps to a machine role and/or may supply the machine role for each machine that was accessed during the logon session. Logon ID, Account Instance, Role Instance pairs may be used as unique identifiers of logon sessions.

Different detection models 161-163 may be employed to score the logon sessions based on counts 154 and logon session data 155. Different detection models 161-163 may perform operations using counts 154 and logon session data 155 to determine calculated or estimated values such as: ratios of counts, probabilities (e.g., conditional probabilities), log probabilities, negative log probabilities, likelihoods, log likelihoods, negative log likelihoods, and so forth for various types of scenarios.

Detection model 161 may compute values or scores such as: the negative log of the conditional probability of a particular role type observing the successful logon event given a particular account type, the negative log of the conditional probability of a particular account type observing the successful logon event given a particular role type, the negative log of the conditional probability of a particular logon type observing the successful logon event given a particular role type, and the negative log of the conditional probability of a particular logon type observing the successful logon event given a particular account type.

Detection model 162 may compute values or scores such as: the negative log of the conditional probability of a particular role type observing a particular security event sequence given a particular account type; and the negative log of the conditional probability of a particular account type observing a particular security event sequence given a particular role type. Detection model 163 may compute a value or score such as: the negative log of the probability of a particular account type observing a particular inter-event time interval.

Different detection models 161-163 may normalize calculated or estimated values to output one or more normalized scores (e.g., z-scores) for each logon session, account, and/or machine. Detection model 161 may output normalized or z-scores $Z_1$-$Z_4$. Detection model 162 may output normalized or z-score $Z_5$ and $Z_6$. Detection model 163 may output normalized or z-score $Z_7$. Each of the normalized or z-scores $Z_1$-$Z_7$ may provide a separate assessment, detection, feature, and/or alert of whether one or more security events that occurred during the logon session indicate compromised behavior. When data for a particular detection model is missing, the one or more normalized or z-scores for the particular detection model may be assigned a value of zero.

Normalized or z-scores $Z_1$-$Z_7$ may be calculated in various ways. When base-line weighting is employed, the mean and standard deviation statistics from the session data of the current scoring day for each model feature may be used to normalize session scores. When trained feature weights are employed, the mean and standard deviation statistics from the model training data for a particular model feature may be used to normalize session scores.

A combiner component 165 may combine the normalized or z-scores $Z_1$-$Z_7$ output by the different detection models 161-163. Combiner 165 may employ a combining function that includes feature weights (e.g., $W_1$-$W_7$) to bias the normalized or z-score scores $Z_1$-$Z_7$. When base-line weighting is employed, an equal weight (e.g., 1/7 weighting) may be assigned to each z-score based on the total number of z-scores to be combined. When trained feature weights are employed, each feature weight may be based on the relative importance of the corresponding normalized or z-score. Combiner 165 may compute and output a ranking score based on combined normalized or z-score scores $Z_1$-$Z_7$. In one exemplary implementation, the ranking score for a particular logon session based on z-scores $Z_1$-$Z_7$ may be calculated as: $(W_1Z_1+W_2Z_2+W_3Z_3+W_4Z_4+W_5Z_5+W_6Z_6+W_7Z_7)$.

A presenter component 166 may be configured and/or employed to generate and present a list of ranked alerts based on the ranking scores for each logon session, account, and/or machine. The list of ranked alerts may identify compromised authorized accounts and/or compromised machines of the computer network. The list of ranked alerts may present the top K (e.g., top 10) compromised accounts and/or machines to provide a human data analyst with the relevant alerts that require investigation.

Presenter component 166 may be configured and/or employed to automatically generate an attack graph based on compromised account-machine pairs. The attack graph may display a visual representation of nodes and edges that graphically illustrates one or more probable paths (e.g., top K paths) that an attacker may have traveled. Each compromised account/machine pair that has been identified may be used as a node of the attack graph. The attack graph may probabilistically estimate possible attack paths among the nodes and display the top K probable paths that an attacker could have traversed. The attack graph may visually represent lateral movement and/or privilege escalation by an attacker.

A trainer component 167 may be configured and/or employed to train the combining function. Trainer component 167 may train, test, evaluate, and/or refine the combining function based on feedback from the human data analyst and/or based on various statistical and/or machine-learning techniques. Trainer component 167 may receive negative log probabilities from model features as training input and may output learned weights. Trainer component 167 also may output mean and standard deviation statistics from the training population for each model feature. The mean and standard deviation for a particular model feature may be used to calculate a z-score for the particular model feature. Trainer component 167 may update and/or refine one or more of feature weights (e.g., $W_1$-$W_7$) so that the combining function learns and improves over time.

A publisher component 168 may be configured and/or employed to publish updated feature weights for the combining function. The mean and standard deviation from training data also may be published to normalize newly observed negative log probabilities against the model population so that weights can be applied and the final ranking score can be computed. Publisher component 168 may provide feature weights and the mean and standard deviation statistics to combiner component 165 for use when scoring new logon sessions, accounts, and/or machines.

Exemplary User Interfaces

Figure 1C:
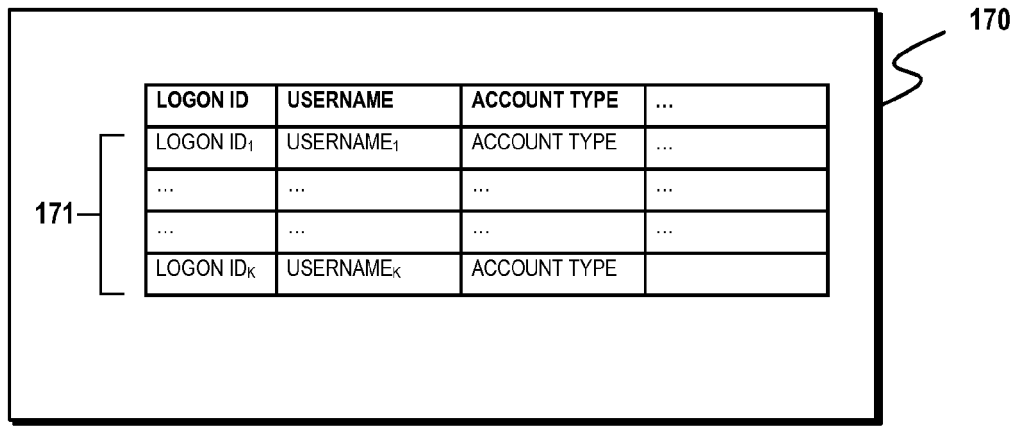
FIG. 1C illustrates an embodiment of an exemplary user interface in accordance with aspects of the described subject matter.

FIG. 1C illustrates a user interface (UI) 170 as an embodiment of an exemplary user interface in accordance with aspects of the described subject matter. In various embodiments, UI 170 may be implemented by computer-executable instructions that may be executed by one or more computing devices and/or computer systems.

UI 170 may present a list of ranked alerts 171 based on the ranking scores for each logon session, account, and/or machine. The list of ranked alerts 171 may identify compromised authorized accounts and/or compromised machines of the computer network. In various implementations, each alert may identify logon session data for a compromised account such as logon ID, account name and/or username, account type, and so forth.

The list of ranked alerts 171 may present the top K (e.g., top 10) compromised accounts and/or machines to provide a human data analyst with the relevant alerts that require investigation. Selection of a particular alert from the list of ranked alerts 171 may allow the human data analyst to drill down and obtain further details regarding a compromised account and/or machine.

Figure 1D:
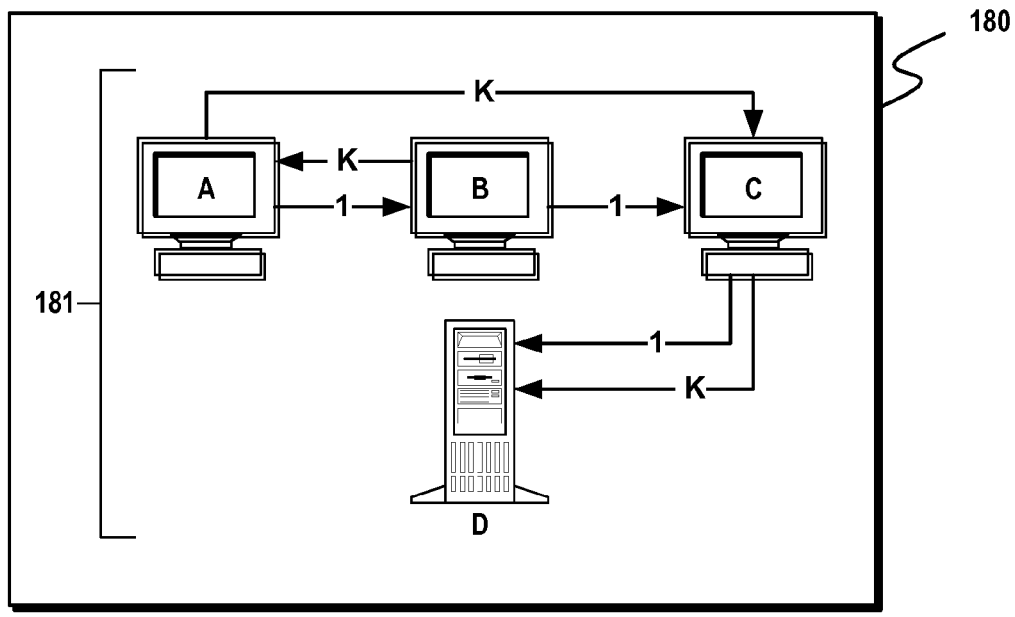
FIG. 1D illustrates an embodiment of an exemplary user interface in accordance with aspects of the described subject matter.

FIG. 1D illustrates a user interface (UI) 180 as an embodiment of an exemplary user interface in accordance with aspects of the described subject matter. In various embodiments, UI 180 may be implemented by computer-executable instructions that may be executed by one or more computing devices and/or computer systems.

UI 180 may present an attack graph 181 that is automatically generated based on compromised account-machine pairs. The attack graph 181 may display a visual representation of nodes and edges that graphically illustrates probable paths (e.g., top K paths) that an attacker may have traveled. Each compromised account/machine pair that has been identified may be used as a node of the attack graph.

The attack graph 181 may probabilistically estimate possible attack paths among the nodes and display the top K probable paths that an attacker could have traversed. The attack graph 181 may visually represent lateral movement and/or privilege escalation by an attacker. In some implementations, the attack graph 181 may be generated in response to selection of a particular alert from the list of ranked alerts 171.

Exemplary Process

Figure 2:
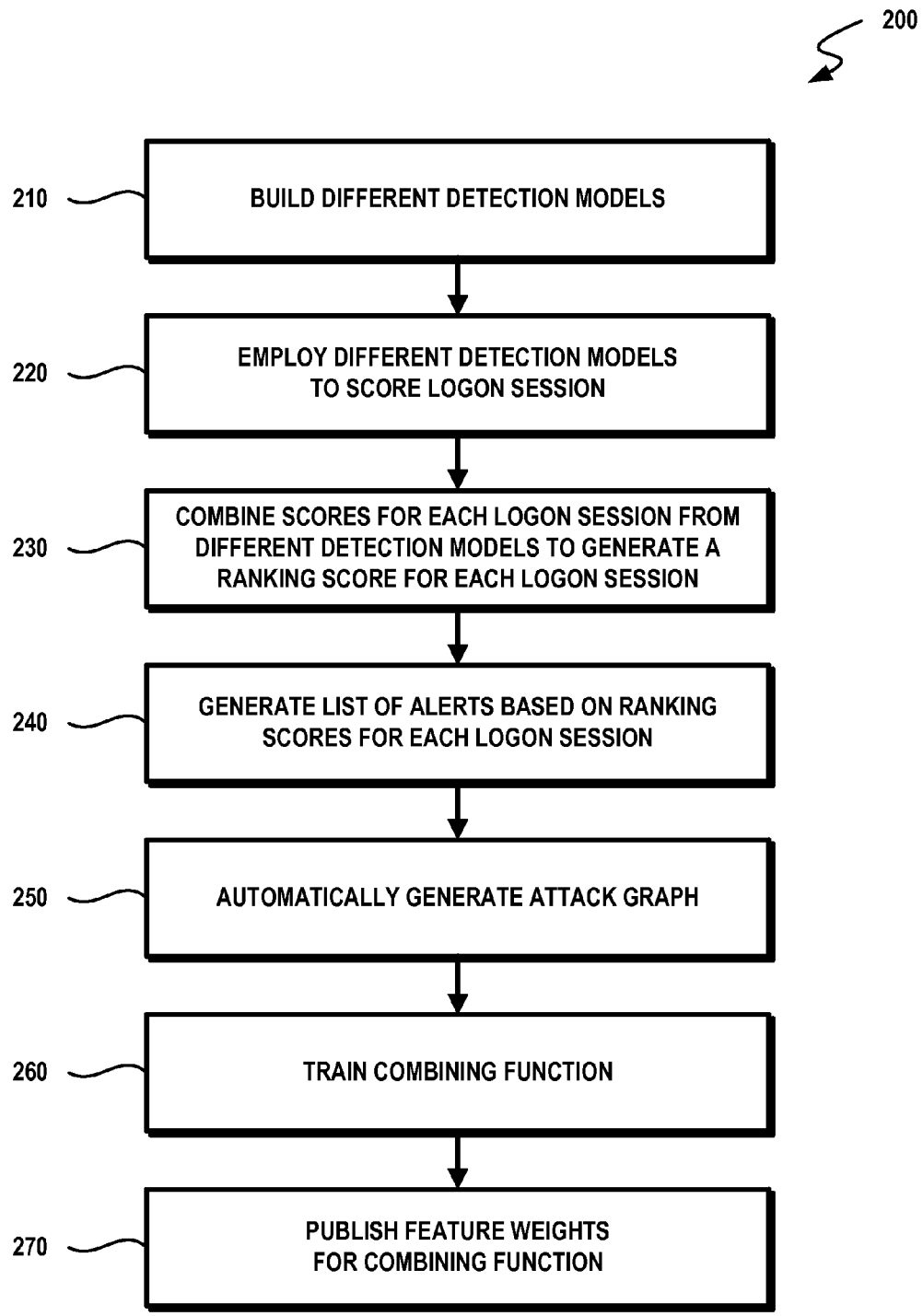
FIG. 2 illustrates an embodiment of an exemplary process in accordance with aspects of the described subject matter.

FIG. 2 illustrates a computer-implemented method 200 as an embodiment of an exemplary lateral movement detection process in accordance with aspects of the described subject matter. Computer-implemented method 200, or portions thereof, may be performed by detection model system 160. It is to be appreciated that computer-implemented method 200, or portions thereof, may be performed one or more computing devices, computer-executable instructions, software, hardware, firmware or a combination thereof in various embodiments.

At 210, different detection models 161-164 may be built. The different detection models 161-164 may include probabilistic intrusion detection models for detecting compromised behavior based on logon behavior, a sequence of security events observed during a logon session, inter-event time between security events observed during a logon session, and/or an attempt to logon using explicit credentials. Detection models 161-164 may be configured to provide multiple independent assessments of security event data (e.g., security event logs 152) for modeling and detecting certain types of behaviors associated with compromised accounts/machines.

Detection models 161-164 may be built using a baselining approach and/or unlabeled security event training data to learn historical proportions. Detection models 161-164 may be defined and/or implemented in terms of counts 154 generated from security event data with respect to variables such as account/account type, machine role, logon type, event type, event sequence, event time, and so forth. Counts 154 may be computed from historical security event data that was generated in response to activities of authorized accounts on machines of the computer network. Particular variables for counts 154 may be based on characteristics of the security event data and/or the computer network being monitored (e.g., authorized accounts and machine roles).

Counts 154 may be computed from security event logs 152 using various types of analysis and/or extraction techniques such as by submitting queries to and/or running processes on storage system 150 (e.g., cloud-computing storage system). When computing counts 154, certain variable values may be aggregated over certain account types, machine roles/role types, and/or times. After being computed, counts 154 for implementing and/or utilization by detection models 161-164 may be stored as data files in storage system 150 for access and further processing (e.g., estimating probabilities from counts) by one or more local machines.

Counts 154 may include a count of successful logon events (e.g., occurrences of Security Event ID 4624) observed for each combination of account/account type, machine role, logon type, and time bucket index. Counts 154 may include counts of each possible N-gram security event sequence (e.g., trigram sequence of security event IDs) observed in the logon sessions for an account/account type, machine role/role type, and/or account/account type-role/role type pair. Counts 154 may include counts of each possible inter-event time interval observed in the logon sessions for an account/account type. Counts 154 may include counts of logon attempts using explicit credentials (e.g., occurrences of Security Event ID 4648) observed for each combination of account/account type, machine role/role type, and time bucket index.

At 220, different detection models 161-164 may be employed to score logon sessions. The different detection models 161-164 may be provided with logon session data 155 obtained and/or received from security event logs 152, security event monitor 140, and/or other networked device or source. The logon session data 155 may be associated with one or more logon sessions that include activities performed by authorized accounts on machines of a computer network. The logon session data 155 may indicate security events (e.g., security event IDs) that occurred during the logon sessions.

Logon session data 155 for a logon session may correspond to a particular account or a particular account/machine pair and include security event data for particular types of security events (e.g., Security Event ID 4624, Security Event ID 4648, etc.). Logon session data 155 for a logon session may indicate security events that were triggered during the logon session and that are correlated to the logon session via logon ID and/or logon GUID. Logon session data 155 for a logon session may include a machine identifier (e.g., machine name, IP address) that maps to a machine role and/or may supply the machine role for each machine that was accessed during the logon session. Logon ID, Account Instance, Role Instance pairs may be used as unique identifiers of logon sessions.

The different detection models 161-164 may be employed to score the logon sessions based on counts 154 and logon session data 155. Counts 154 may be accessed from storage system 150. Operations may be performed using counts 154 and logon session data 155 to compute calculated or estimated values such as: ratios of counts, probabilities (e.g., conditional probabilities), log probabilities, negative log probabilities, likelihoods, log likelihoods, negative log likelihoods, and so forth for various types of scenarios.

Calculated or estimated values may include: the negative log of the conditional probability of a particular role type observing the successful logon event given a particular account type, the negative log of the conditional probability of a particular account type observing the successful logon event given a particular role type, the negative log of the conditional probability of a particular logon type observing the successful logon event given a particular role type, and/or the negative log of the conditional probability of a particular logon type observing the successful logon event given a particular account type.

Calculated or estimated values may include: the negative log of the conditional probability of a particular role type observing a particular security event sequence given a particular account type and/or the negative log of the conditional probability of a particular account type observing a particular security event sequence given a particular role type. Calculated or estimated values may include the negative log of the probability of a particular account type observing a particular inter-event time interval. Calculated or estimated values may include: the negative log of the conditional probability of a particular role type observing the logon attempt using explicit credentials given a particular account type and/or the negative log of the conditional probability of a particular account type observing a logon attempt using explicit credentials given a particular role type.

Calculated or estimated values may be normalized to output one or more normalized scores (e.g., z-scores) for each logon session, account, and/or machine. Each normalized or z-score may be based on mean and standard deviation statistics from logon session data 155 and/or model training data. Each of the different detection models 161-164 may output one or more normalized scores or z-scores for each logon session that assess whether one or more security events that occurred during the logon session are indicative of compromised behavior. Each different normalized or z-score may correspond to a certain calculated or estimated value computed by a particular detection model. Normalized scores or z-scores for each logon session that are output by different detection models 161-164 may provide independent assessments, detections, features, and/or alerts of whether the one or more security events that occurred during the logon session are indicative of compromised behavior based on different types of logon session behavior.

At 230, scores for each logon session that are output by different detection models 161-164 may be combined to generate a ranking score for each logon session, account, and/or machine. A combining function may be employed to sum or otherwise stitch together normalized or z-scores output by the different detection models 161-164. When data for a particular detection model is missing, the one or more normalized or z-scores for the particular detection model may be assigned a value of zero.

The combining function may use feature weights to bias the normalized or z-score scores output from the different detection models 161-164. When base-line weighting is employed, an equal weight may be assigned to each z-score based on the total number of z-scores to be combined. When trained feature weights are employed, each normalized score or z-score may be assigned a feature weight based on the relative importance of the normalized or z-score. As such, the summation of the normalized or z-scores may be biased to treat certain normalized or z-scores as being more important than others when detecting compromised behavior. The combined normalized or z-scores may provide a ranking score for each logon session, account, and/or machine. The ranking score may be computed by: multiplying each normalized (e.g., z-score) by the feature weight assigned to the normalized score and taking the sum of the weighted normalized scores.

At 240, a list of ranked alerts 171 may be generated based on the ranking scores for each logon session, account, and/or machine. The list of ranked alerts 171 may identify compromised authorized accounts and/or compromised machines of the computer network. The ranking score for each logon session, account, and/or machine may be used to rank and present the top K (e.g., top 10) compromised accounts and/or machines to provide a human data analyst with the relevant alerts that require investigation.

At 250, an attack graph 181 may be automatically generated. The attack graph 181 may display a visual representation of nodes and edges that graphically illustrates probable paths (e.g., top K paths) that an attacker may have traveled. Each compromised account/machine pair that has been identified may be used as a node of the attack graph 181. The attack graph 181 may probabilistically estimate possible attack paths among the nodes and display the top K probable paths that an attacker could have traversed. The attack graph 181 may visually represent lateral movement and/or privilege escalation by an attacker.

At 260, the combining function may be trained. The combining function may be trained, tested, evaluated, and/or refined based on feedback from the human data analyst. Feature weights for the normalized scores may be assigned and/or updated based on feedback from the human data analyst so that the combining function learns and improves over time.

Training, testing, and/or evaluating the combining function may be performed using various statistical, artificial intelligence, and/or machine-learning techniques. In one implementation, the combining function may be trained using cross-validation (e.g., five-fold cross-validation) and supervised machine learning that employs gradient descent algorithms and a neural network model to learn ranking functions.

The training phase may receive negative log probabilities from model features as training input and may output learned weights. The training phase also may output mean and standard deviation statistics from the training population per model feature. The mean and standard deviation for a particular model feature may be used to calculate a z-score for the particular model feature.

Evaluated sessions may be labeled as malicious or benign and used as training input for refining the combining function. Using k-fold cross-validation, 1/k of the set of malicious sessions and 1/k of the set of benign sessions may be held back. The remaining malicious and benign session may be used to generate training pairs, which are then tested using the held back sessions. Initial ranking scores may be computed for malicious and benign using 1/7 weighting, for example, and the average precision of the initial ranking scores may be computed.

Ranking scores may be trained and tested over N iterations using machine learning (e.g., gradient descent) to update feature weights. The next 1/k malicious and benign sessions may be held back, and the process may be repeated to use each 1/k of the malicious and benign sessions as validation data. The performance of the combining and ranking function may be evaluated and, if determined to perform better than an average ranker, used to train based on 100% of the training data. While certain exemplary training has been described, it is to be appreciated that various types of statistical, artificial intelligence, and/or machine learning techniques may be employed.

At 270, feature weights for the combining function may be published. Assigned, updated, and/or refined feature weights for the normalized scores may be published to and employed by the combining function. The mean and standard deviation from the training data also may be published with each of the feature weights to normalize newly observed negative log probabilities against the model population so that weights can be applied and the final ranking score can be computed. As such, the combining function may improve based on human feedback and/or machine learning and evolve to adapt to changing attack tactics.

It can be appreciated that aspects of the described subject matter may provide various attendant and/or technical advantages in terms of improved efficiency and/or savings with respect to power consumption, memory, processor cycles, and/or other computationally-expensive resources. By way of illustration and not limitation, aspects of detection model system 160 may provide faster detection and diagnosis of lateral movement so that the scope of a network breach can be determined and appropriate containment and remediation can be performed. Accordingly, detection model system 160 may protect and maintain the health of network resources.

Aspects of detection model system 160 may support a broad scope for detecting compromised behavior based on various types of logon session behavior and combine independent assessments or alerts to present a ranked list of high fidelity alerts that identifies compromised authorized accounts and/or compromised machines of a computer network. Accordingly, detection model system 160 may reduce the burden of a human data analyst and minimize processing overhead and network bandwidth utilization.

Aspects of detection model system 160 may promote and facilitate efficient processing of security event data by building detection models from unlabeled security event data, aggregating counts over accounts and/or roles of the same type, and distributing storage and/or processing. Accordingly, detection model system 160 may efficiently perform analysis and scale on vast amounts of data.

Aspects of detection model system 160 may promote meaningful intrusion detections. Detection model system 160 may apply feedback from human data analysts and machine learning to trigger high fidelity alerts. Feature weights for normalized scores may be assigned and/or updated so that the combining function learns and improves over time. New detection models may be added to expand the scope of detections, and normalized scores output by a new detection model may be combined with the normalize scores output by existing detection models. Existing detection models that are determined to be unimportant may be removed or replaced. Accordingly, detection model system 160 may improve and evolve over time to provide the most meaningful types of detections.

Exemplary Operating Environment

Aspects of the described subject matter may be implemented for and/or by various operating environments, computer networks, platforms, frameworks, computer architectures, and/or computing devices to provide lateral movement detection and/or other types of intrusion detection. Aspects of the described subject matter may be implemented by computer-executable instructions that may be executed by one or more computing devices, computer systems, and/or processors.

In its most basic configuration, a computing device and/or computer system may include at least one processing unit (e.g., single-processor units, multi-processor units, single-core units, and/or multi-core units) and memory. Depending on the exact configuration and type of computer system or computing device, the memory implemented by a computing device and/or computer system may be volatile (e.g., random access memory (RAM)), non-volatile (e.g., read-only memory (ROM), flash memory, and the like), or a combination thereof.

A computing devices and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system.

In various embodiments, aspects the described subject matter may be implemented by computer-executable instructions stored on one or more computer-readable storage media. As used herein, the terms "computer-readable storage media" and "computer-readable storage medium" do not refer to and do not encompass a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. Exemplary output devices include, without limitation: a display, a projector, a speaker, a printer, and/or other type of output mechanism and/or device.

A computing device may be configured to receive and respond to input in various ways depending upon implementation. Responses may be presented in various forms including, for example: presenting a user interface, outputting an object such as an image, a video, a multimedia object, a document, and/or other type of object; outputting a text response: providing a link associated with responsive content; outputting a computer-generated voice response or other audio: or other type of visual and/or audio presentation of a response.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

A computing device may be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device may be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device may include and/or run one or more computer programs implemented, for example, by software, firmware, hardware, logic, and/or circuitry of the computing device. Computer programs may be distributed to and/or installed on a computing device in various ways. For instance, computer programs may be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device may include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device may include one or more client applications. Exemplary client applications include, without limitation: a web browsing application, a communication application (e.g., a telephony application, an e-mail application, a text messaging application, an instant messaging application, and the like), a media application (e.g., a video application, a movie service application, a television service application, a music service application, an e-book application, a photo application, and the like), a calendar application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device may include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like: and/or other type of application, application program, and/or app suitable for running on a computing device.

A computer system may be implemented by a computing device, such as a server computer, or by multiple computing devices configured to implement a service in which one or more suitably-configured computing devices may perform one or more processing steps. A computer system may be implemented as a distributed computing system in which components are located on different computing devices that are connected to each other through network (e.g., wired and/or wireless) and/or other forms of direct and/or indirect connections. A computer system also may be implemented via a cloud-based architecture (e.g., public, private, or a combination thereof) in which services are delivered through shared data centers. Some components of a computer system may be disposed within a cloud while other components are disposed outside of the cloud.

Figure 3:
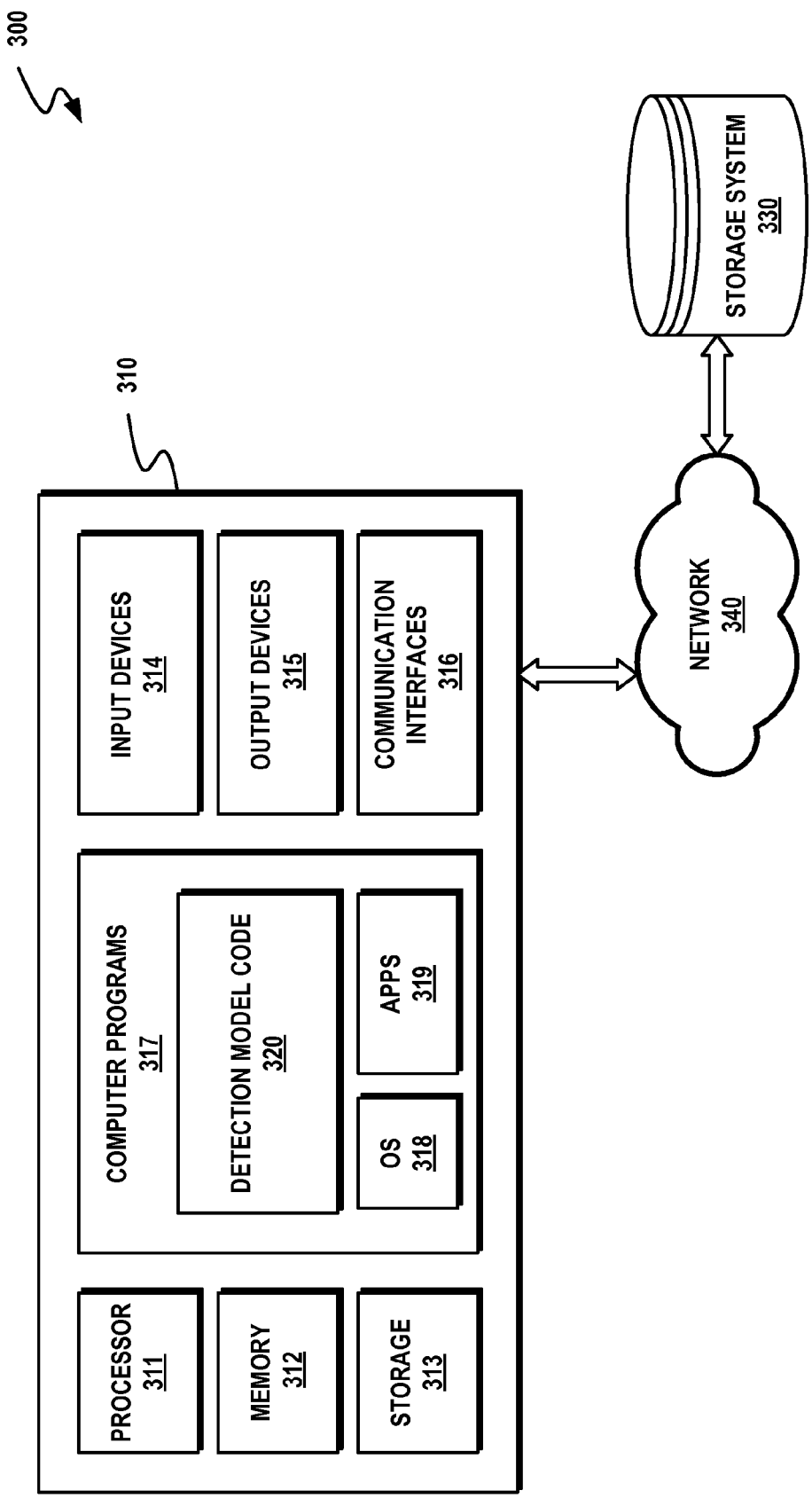
FIG. 3 illustrates an embodiment of an exemplary operating environment that may implement aspects of the described subject matter.

FIG. 3 illustrates an operating environment 300 as an embodiment of an exemplary operating environment that may implement aspects of the described subject matter. As shown, operating environment may include a computing device 310 that is communicatively coupled to a storage system 330.

In various implementations, storage system 330 may be configured to store one or more types of data such as security event data, security event logs 152, counts 154, logon session data 155, and/or other types of data in accordance with aspects of the described subject matter. Storage system 330 may provide any suitable type of data storage such as database storage, blob storage, cloud storage, and so forth. Storage system 330 may be implemented by one or more computing devices, such as a computer cluster in a data center.

Computing device 310 may communicate with storage system 330 over a network 340. Network 340 may be implemented by any type of network or combination of networks suitable for providing communication between computing device 310 and storage system 330. Network 340 may include, for example and without limitation: a wide area network (WAN) such as the Internet, a local area network (LAN), a private network, a public network, a packet network, a circuit-switched network, a wired network, and/or a wireless network. Computing device 310 and storage system 330 may communicate over network 340 using various communication protocols and/or data types.

Computing device 310 may be configured to implement and/or perform one or more aspects of the described subject matter. Computing device 310 may include a processor 311 and memory 312. Computing device 310 also may include additional hardware storage 313. It is to be understood that computer-readable storage media includes memory 312 and hardware storage 313.

Computing device 310 may include input devices 314 and output devices 315. Input devices 314 may include one or more of the exemplary input devices described above and/or other type of input mechanism and/or device. Output devices 315 may include one or more of the exemplary output devices described above and/or other type of output mechanism and/or device.

Computing device 310 may contain one or more communication interfaces 316 that allow computing device 310 to communicate with other computing devices and/or computer systems over network 340. In various implementations, computing device 310 may employ communication interfaces 316 in the context of communicating over network 340 with storage system 330. Communication interfaces 316 also may be used in the context of distributing computer-executable instructions over network 340.

Computing device 310 may include and/or run one or more computer programs 317 implemented, for example, by software, firmware, hardware, logic, and/or circuitry of computing device 310. Computer programs 317 may include an operating system 318 implemented, for example, by one or more exemplary operating systems described above and/or other type of operating system suitable for running on computing device 310. Computer programs 317 may include one or more applications 319 implemented, for example, by one or more exemplary applications described above and/or other type of application suitable for running on computing device 310.

Computer programs 317 may be configured via one or more suitable interfaces (e.g., an application programming interface (API) or other data connection) to communicate and/or cooperate with one or more resources. Examples of resources include local computing resources of computing device 310 and/or remote computing resources such as server-hosted resources, cloud-based resources, online resources, remote data stores, remote databases, remote repositories, web services, web sites, web pages, web content, and/or other types of remote resources.

Computer programs 317 may implement computer-executable instructions that are stored in computer-readable storage media such as memory 312 or hardware storage 313, for example. Computer-executable instructions implemented by computer programs 317 may be configured to work in conjunction with, support, and/or enhance one or more of operating system 318 and applications 319. Computer-executable instructions implemented by computer programs 317 also may be configured to provide one or more separate services.

Computer programs 317 may implement computer-executable instructions using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

Computing device 310 and/or computer programs 317 may implement and/or perform aspects of the described subject matter. As shown, computing device 310 and/or computer programs 317 may include detection model code 320. In various embodiments, detection model code 320 may include computer-executable instructions that are stored on a computer-readable storage medium and configured to implement one or more aspects of the described subject matter. By way of example, and without limitation, detection model code 320 may implement one or more aspects of detection model system 160, detection models 161-164, and/or computer-implemented method 200.

Exemplary Computing Environment

FIG. 4 illustrates a computing environment 400 as an embodiment of an exemplary computing environment that may implement aspects of the described subject matter. As shown, computing environment 400 includes a general-purpose computing device in the form of a computer 410. In various implementations, computer 410 may be an example of computing device 310.

Computer 410 may include various components that include, but are not limited to: a processing unit 420 (e.g., one or processors or type of processing unit), a system memory 430, and a system bus 421 that couples various system components including the system memory 430 to processing unit 420.

System bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, an operating system 434, application programs 435, other program modules 436, and program data 437 are shown.

Computer 410 may also include other removable/non-removable and/or volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 441 is typically connected to system bus 421 through a non-removable memory interface such as interface 440, and magnetic disk drive 451 and optical disk drive 455 are typically connected to system bus 421 by a removable memory interface, such as interface 450.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 4, provide storage of computer readable instructions, data structures, program modules and other data for the computer 410. For example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a touch screen joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB).

A visual display 491 or other type of display device is also connected to the system bus 421 via an interface, such as a video interface 490. In addition to the monitor, computers may also include other peripheral output devices such as speakers 497 and printer 496, which may be connected through an output peripheral interface 495.

Computer 410 is operated in a networked environment using logical connections to one or more remote computers, such as a remote computer 480. Remote computer 480 may be a personal computer, a hand-held device, a server, a router, a network PC, a peer device or other common network node, and typically includes many or all of the elements described above relative to the computer 410. The logical connections depicted include a local area network (LAN) 471 and a wide area network (WAN) 473, but may also include other networks. Such networking environments are commonplace in offices, enterprise-wide computer networks, intranets and the Internet.

When used in a LAN networking environment, computer 410 is connected to LAN 471 through a network interface or adapter 470. When used in a WAN networking environment, computer 410 typically includes a modem 472 or other means for establishing communications over the WAN 473, such as the Internet. Modem 472, which may be internal or external, may be connected to system bus 421 via user input interface 460, or other appropriate mechanism. In a networked environment, program modules depicted relative to computer 410, or portions thereof, may be stored in a remote memory storage device. By way of example, and not limitation, remote application programs 485 as shown as residing on remote computer 480. It will be appreciated that the network connections shown are exemplary and other means of establishing a communications link between the computers may be used.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer-implemented method for performing network intrusion detection in a computer network having multiple computing devices, the method comprising:

receiving logon session data related to activities performed related to an authorized account during a logon session on a computing device in the computer network, the logon session data including data representing security events triggered during the logon session in response to the authorized account accessing a computing device in the computer network;

deriving multiple probabilities of intrusion related to the logon session based on a comparison of the logon session data with distinct combinations of security event variables and a historical occurrence value of the individual distinct combinations of the security event variables, the individual probabilities of intrusion indicating whether one or more security events related to the logon session are indicative of a compromised behavior; and indicating at least one of the authorized account or the computing device of the computer network corresponding to the logon session as comprised based on a combination of the derived multiple probabilities of intrusion related to the logon session.

2. The computer-implemented method of claim 1 wherein the security events can include at least some of events of account logon/logoff, authentication, account management, process creation/termination, directory service, object access, application initiation/termination, file sharing, policy change, privileged use, or system event.

3. The computer-implemented method of claim 1 wherein one of the distinct combinations of the security event variables is configured to assess whether a logon behavior is indicative of compromised behavior, the distinct combination of the security event variables include at least some of an account, an account type, a machine role, a machine role type, a time of logon, or a logon type.

4. The computer-implemented method of claim 1 wherein one of the distinct combinations of the security event variables is configured to assess whether a sequence of security events observed during the logon session is indicative of compromised behavior based on a historical occurrence value of the same sequence of security events observed during previous logon sessions.

5. The computer-implemented method of claim 4 wherein the historical occurrence value of the same sequence of security events during previous logon sessions includes a count of the same sequence of security events observed during previous logon sessions.

6. The computer-implemented method of claim 1 wherein one of the distinct combinations of the security event variables is configured to assess whether an inter- event time between security events is indicative of compromised behavior, the distinct combination of the security event variables include an account or account type and an associated sequence of security events and corresponding inter-event times between successive security events in the sequence.

7. The computer-implemented method of claim 1 wherein one of the distinct combinations of the security event variables is configured to assess whether an attempt to logon using explicit credentials during the logon session is indicative of compromised behavior, the distinct combination of the security event variables include at least some of an account, an account type, a machine role, a machine role type, a time of attempted logon related to logon attempt using explicit credentials.

8. The computer-implemented method of claim 1, further comprising:

combining the derived multiple probabilities of intrusion related to the logon session to an overall possibility value; and indicating at least one of the authorized account or the computing device of the computer network as comprised includes indicating at least one of the authorized account or the computing device of the computer network as comprised when the overall possibility value related to the logon session is greater than other overall possibility values related to additional logon sessions.

9. The computer-implemented method of claim 8, further comprising:

ranking the overall possibility values of the logon session and the additional logon sessions;

according to the ranked overall possibility values, indicating several of the authorized accounts and/or computing devices as compromised; and generating an attack graph based on compromised account-machine pairs to visually display one or more probable paths of an attack.

10. The computer-implemented method of claim 1 wherein the distinct combinations of security event variables include at least some of:

a combination of at least some of an account, an account type, a machine role, a machine role type, a time of logon, or a logon type;

a combination of at least some of an account, an account type, a machine role, or a machine role type, and a sequence of security events;

a combination of an account or account type and an associated sequence of security events and corresponding inter-event times between successive security events in the sequence; or a combination of at least some of an account, an account type, a machine role, a machine role type, a time of attempted logon related to logon attempt using explicit credentials.

11. A computing device in a computer network containing multiple other computing devices, the computing device comprising:

a processor for executing computer-executable instructions; and memory storing computer-executable instructions executable by the processor to cause the processor to perform a process comprising:

receiving logon session data related to activities performed related to authorized accounts during logon sessions on a corresponding computing device in the computer network, the logon session data including data representing security events triggered during the logon sessions in response to the authorized accounts accessing the corresponding computing device in the computer network;

for each of the logon sessions:

deriving multiple probabilities of intrusion related to the logon session based on a comparison of the logon session data with distinct combinations of security event variables and a historical occurrence value of the individual distinct combinations of the security event variables, the individual probabilities of intrusion indicating whether one or more security events related to the logon session are indicative of a compromised behavior; and combining the derived multiple probabilities of instruction related to the logon session into an overall probability related to the logon session; and generating a list of ranked alerts by ranking the overall probabilities for the logon sessions, wherein the list of ranked alerts identifying one or more of compromised authorized accounts and/or compromised computing devices in the computer network.

12. The computing device of claim 11 wherein:

each overall probability corresponding to one of the logon sessions is assigned a weighting factor; and combining the derived multiple probabilities includes combining the derived multiple probabilities using the weighting factors.

13. The computing device of claim 11 wherein the distinct combinations of security event variables include at least some of:

a combination of at least some of an account, an account type, a machine role, a machine role type, a time of logon, or a logon type;

a combination of at least some of an account, an account type, a machine role, or a machine role type, and a sequence of security events;

a combination of an account or account type and an associated sequence of security events and corresponding inter-event times between successive security events in the sequence; or a combination of at least some of an account, an account type, a machine role, a machine role type, a time of attempted logon related to logon attempt using explicit credentials.

14. The computing device of claim 11 wherein one distinct combination of the security event variables is configured to assess whether a sequence of security events observed during the logon session is indicative of compromised behavior based on a historical occurrence value of the same sequence of security events observed during previous logon sessions.

15. The computing device of claim 14 wherein the one distinct combination of the security event variables includes:

at least some of an account, an account type, a machine role, or a machine role type; and a sequence of security events having three or four security events, each sequence of security events corresponding to a number of occurrences that the sequence of security events has been previously observed.

16. A computer-readable storage medium storing computer-executable instructions that executable by a processor of a computing device to cause the computing device to perform a process comprising:

receiving logon session data related to activities performed related to authorized accounts during logon sessions on a corresponding computing device in the computer network, the logon session data including data representing security events triggered during the logon sessions in response to the authorized accounts accessing the corresponding computing device in the computer network;

for each of the logon sessions:

deriving multiple probabilities of intrusion related to the logon session based on a comparison of the logon session data with distinct combinations of security event variables and a historical occurrence value of the individual distinct combinations of the security event variables, the individual probabilities of intrusion indicating whether one or more security events related to the logon session are indicative of a compromised behavior; and combining the derived multiple probabilities of instruction related to the logon session into an overall probability related to the logon session; and ranking the overall probabilities for the logon sessions; and selecting a number of authorized accounts and/or computing devices as compromised based on the ranked overall probabilities.

17. The computer-readable storage medium of claim 16 wherein one of the distinct combinations includes a combination of an account or account type, a machine role or machine role type, a time of logon, and a logon type, and wherein the historical occurrence value corresponding to the distinct combination includes a number of occurrence of successful logons with values of account or account type, machine role or machine role type, time of logon, and logon type corresponding to those in the received logon session data.

18. The computer-readable storage medium of claim 16 wherein one of the distinct combinations includes a combination of at least some of an account, an account type, a machine role, or a machine role type, and a sequence of security events, and wherein the historical occurrence value corresponding to the distinct combination includes a number of occurrences that the event sequence in the received logon session data has been observed based on account type and machine role type.

19. The computer-readable storage medium of claim 16 wherein one of the distinct combinations includes a combination of an account or account type and an associated sequence of security events and corresponding inter-event times between successive security events in the sequence, and wherein the historical occurrence value includes a number of times the inter-event time interval in the logon session data has been observed based on the account type.

20. The computer-readable storage medium of claim 16 wherein one of the distinct combinations includes a combination of an account type, a machine role type, a time of attempted logon related to logon attempt using explicit credentials, and wherein the historical occurrence value includes a number of logon attempts using explicit credentials based on the account type, machine role type, and time.

* * * * *